(12) United States Patent
Tasdelen et al.

(10) Patent No.: US 12,179,303 B2
(45) Date of Patent: Dec. 31, 2024

(54) METHOD AND DEVICE TO ASCERTAIN A QUALITY OF A PRODUCT OBTAINED BY SUBTRACTIVE MANUFACTURING

(71) Applicant: Kistler Holding AG, Winterthur (CH)

(72) Inventors: Bülent Tasdelen, Gothenburg (SE); Gunnar Keitzel, Hettlingen (CH)

(73) Assignee: Kistler Holding AG, Winterthur (CH)

( * ) Notice: Subject to any disclaimer, the term of this patent is extended or adjusted under 35 U.S.C. 154(b) by 568 days.

(21) Appl. No.: 17/361,563

(22) Filed: Jun. 29, 2021

(65) Prior Publication Data

US 2022/0001506 A1 Jan. 6, 2022

(30) Foreign Application Priority Data

Jul. 2, 2020 (EP) .................................... 20183727

(51) Int. Cl.
*B23Q 17/09* (2006.01)
*B23Q 15/12* (2006.01)
(Continued)

(52) U.S. Cl.
CPC ......... *B23Q 17/0966* (2013.01); *B23Q 15/12* (2013.01); *B23Q 15/14* (2013.01);
(Continued)

(58) Field of Classification Search
CPC .............. B23Q 17/0966; B23Q 17/099; B23Q 15/12; B23Q 15/14; G05B 2219/37087;
(Continued)

(56) References Cited

U.S. PATENT DOCUMENTS 3,986,010 A 10/1976 Lankford et al.
8,365,642 B2 * 2/2013 Travez ............... B23Q 17/0971
82/1.11
(Continued)

FOREIGN PATENT DOCUMENTS

CN 110 405 533 A 11/2019
EP 3575768 A1 * 12/2019 ........... B23Q 15/007
(Continued)

OTHER PUBLICATIONS

Machine Translation of JP H079608 B2 (Year: 1995).*
(Continued)

*Primary Examiner* — Nathaniel J Kolb
(74) *Attorney, Agent, or Firm* — Dority & Manning, P.A.

(57) ABSTRACT

A method to ascertain a quality of a product formed by a subtractive manufacturing device from a workpiece includes: determining a deflection/test force relation for a deflection of the device; measuring an actually exerted machining force applied by the device to the workpiece; automatically determining a machining force reference for the actually exerted machining force; automatically evaluating whether the actually exerted machining force deviates from the machining force reference. If an actually exerted machining force deviates from the machining force reference, then the method uses the deflection/test force relation to automatically determine for the actually exerted machining force, at least one correction deflection of the device and automatically creating at least one corrected drive control signal to fully or partially reduce the correction deflection.

15 Claims, 16 Drawing Sheets

(51) Int. Cl.
  *B23Q 15/14* (2006.01)
  *B23Q 17/20* (2006.01)
  *G05B 19/401* (2006.01)
  *G05B 19/404* (2006.01)

(52) U.S. Cl.
  CPC ........... *B23Q 17/099* (2013.01); *B23Q 17/20* (2013.01); *G05B 19/401* (2013.01); *G05B 19/404* (2013.01); *B23Q 2717/006* (2013.01); *G05B 2219/31477* (2013.01); *G05B 2219/37087* (2013.01); *G05B 2219/37355* (2013.01); *G05B 2219/37357* (2013.01); *G05B 2219/37374* (2013.01); *G05B 2219/49186* (2013.01); *G05B 2219/50059* (2013.01)

(58) Field of Classification Search
  CPC ........... G05B 2219/31477; G05B 2219/37357; G05B 2219/37374; G05B 2219/49186; G05B 2219/37078; G05B 2219/50059; G05B 19/404; G05B 19/401
  See application file for complete search history.

(56) References Cited

U.S. PATENT DOCUMENTS

| | | | | |
|---|---|---|---|---|
| 9,511,471 | B2* | 12/2016 | Hirano | B23P 9/02 |
| 2007/0067059 | A1* | 3/2007 | Travez | B23Q 15/12 |
| | | | | 700/160 |
| 2008/0105094 | A1* | 5/2008 | McMurtry | B23Q 17/0966 |
| | | | | 82/1.11 |
| 2010/0186560 | A1 | 7/2010 | Tzschentke et al. | |
| 2011/0218668 | A1* | 9/2011 | Morfino | G05B 19/401 |
| | | | | 700/174 |
| 2014/0165351 | A1* | 6/2014 | Hirano | G05B 19/404 |
| | | | | 29/90.01 |
| 2014/0256228 | A1 | 9/2014 | Kaminski et al. | |
| 2018/0307200 | A1 | 10/2018 | Boye | |

FOREIGN PATENT DOCUMENTS

| | | | | |
|---|---|---|---|---|
| EP | 4011528 A1 * | 6/2022 | ............ | B23B 25/06 |
| JP | S5045187 A | 4/1975 | | |
| JP | S56119357 A | 9/1981 | | |
| JP | H079608 B2 * | 2/1995 | | |
| JP | 2008281390 A | 11/2008 | | |
| JP | 2013-146838 | 8/2013 | | |
| JP | 2019209420 A | 12/2019 | | |
| JP | 2020-069600 | 5/2020 | | |
| JP | 2020089924 A | 6/2020 | | |
| KR | 20050115153 A | 12/2005 | | |
| WO | WO 2013/043102 A1 | 3/2013 | | |
| WO | WO2019043742 A1 | 12/2019 | | |

OTHER PUBLICATIONS

Japanese Office Action with English translation for JP application No. 2021-095042, Feb. 9, 2023, 9 pages.
JP Office Action with Translation, Jul. 1, 2022, 17 pages.
Extended European Search Report of Feb. 2, 2021, 19 pages.
Alam A M et al., "Effect of machining procedures on the surface state of a low carbon steel", Nov. 15, 1997, pp. 1559-1567, XP004324912, ISSN: 1359-6462, 9 pages.
Partial European Search Report of Dec. 9, 2020, 15 pages.
EPO Office Action, Feb. 6, 2024, 9 pages.

* cited by examiner

| 1 | TF (N) | ΔX (μm) | ΔY (μm) | ΔZ (μm) | DFX (μm/N) | DFY (μm/N) | DFZ (μm/N) |
|---|---|---|---|---|---|---|---|
| 1' | 20 | 2.4 | 2.0 | 0.8 | 0.120 | 0.100 | 0.040 |
| | 60 | 7.2 | 6.0 | 2.4 | | | |
| | 100 | 12.0 | 10.0 | 4.0 | | | |
| 1" | 100 | 7.5 | 8.0 | 2.5 | 0.075 | 0.080 | 0.025 |
| | 150 | 11.25 | 12.0 | 3.75 | | | |
| | 200 | 15.0 | 16.0 | 5.0 | | | |
| 1'" | 100 | 4.0 | 4.0 | 2.0 | 0.040 | 0.040 | 0.020 |
| | 200 | 8.0 | 10.0 | 4.0 | | | |
| | 300 | 13.0 | 12.0 | 6.0 | | | |

| 1 | ΔCX (N) | ΔCY (N) | ΔCZ (N) | DFX (µm/N) | DFY (µm/N) | DFZ (µm/N) | DPX (µm) | DPY (µm) | DPZ (µm) |
|---|---|---|---|---|---|---|---|---|---|
| 1' | 0 | 20 | 40 | 0.120 | 0.100 | 0.040 | 0.00 | 2.00 | 1.60 |
| 1" | 0 | 10 | 30 | 0.075 | 0.080 | 0.025 | 0.00 | 0.80 | 0.75 |
| 1'" | 0 | 10 | 30 | 0.040 | 0.040 | 0.020 | 0.00 | 0.40 | 1.20 |

METHOD AND DEVICE TO ASCERTAIN A QUALITY OF A PRODUCT OBTAINED BY SUBTRACTIVE MANUFACTURING

FIELD OF THE INVENTION

The present invention relates to a method and a device to ascertain a quality of a product obtained by subtractive manufacturing.

BACKGROUND

Subtractive manufacturing designates machining processes in which a workpiece is shaped by controlled material-removal into a product. Principal machining processes are classified as turning, drilling and milling:

- In turning, a cutting tool removes material from a rotating workpiece. The workpiece rotates around a primary axis, a feed motion of the cutting tool occurs along at least one further axis. The primary axis and the further axis may be in parallel or may be angled.
- In drilling, a rotating cutting tool removes material from a static workpiece. The rotation axis of the cutting tool is the primary axis, a feed motion of the cutting tool occurs along one further axis. The primary axis and the further axis are in parallel.
- In milling, a rotating cutting tool removes material from a static or mobile workpiece. The cutting tool rotates around a primary axis, a feed motion of the cutting tool occurs along at least one further axis. In milling, the primary axis and the further axis may be orthogonal or may be angled.

Subtractive manufacturing is performed by means of a device such a CNC (computer-numerical control) machine device. The device comprises a workpiece holder for holding the workpiece and a cutting tool holder for holding the cutting tool. The device comprises a drive control unit and a drive unit. Based on a digital design of the product, the drive control unit determines a drive control signal such as a workpiece position, a cutting tool position, a workpiece shape, a rotation speed, etc. The drive control unit transmits the drive control signal to the drive unit for driving the workpiece holder and/or the cutting tool holder. According to the drive control signals, a mechanical contact is established and maintained between the cutting tool and the workpiece. During the mechanical contact, the cutting tool exerts a machining force on the workpiece and removes material from the workpiece to obtain a product.

The product obtained by subtractive manufacturing must fulfill a quality property such as dimensional accuracy, surface roughness, etc. In order to fulfill the quality property, additional machining processes such as grinding, honing, etc. must be performed, which require investment and time and generate cost.

WO2013043102A1, which corresponds to US Patent Application Publication No. 2014-0256228 and is hereby incorporated in its entirety herein by this reference for all purposes, discloses a device for turning a workpiece into a product. A magnitude of the machining force acting in normal direction on the workpiece is measured during turning and compared with a pre-established deflection of the CNC machine device. The machining force in normal direction and the deflection have a linear relationship. The linear relationship allows a compensation of form errors and manufacturing imperfections. During turning, the cutting tool is adjusted in relation to the workpiece, such that a measured increase of the magnitude of the machining force in normal direction is counteracted and the quality property of the product is fulfilled.

OBJECTS AND SUMMARY OF THE INVENTION

The object of the present invention is to provide a more efficient and dimensionally more accurate method and device to ascertain a quality of a product obtained by subtractive manufacturing.

This object is achieved by the by the steps and devices described below.

Present invention relates to a method to ascertain a quality of a product obtained by a subtractive manufacturing device that operates on a workpiece, and the method includes the following steps: in a first step: determining at least one deflection/test force relation for a deflection of the subtractive manufacturing device; in a second step: measuring an actually exerted machining force; automatically determining a machining force reference for the actually exerted machining force; automatically evaluating, whether the actually exerted machining force deviates from the machining force reference; if an actually exerted machining force deviates from the machining force reference, then the deflection/test force relation is used to automatically determine for the actually exerted machining force at least one correction deflection of the device; and automatically creating at least one corrected drive control signal to fully or partially reduce the correction deflection.

The method of present invention differs in at least one respect from WO2013043102A1, in that a reference for the actually exerted machining force is automatically determined and automatically used to monitor and to correct the actually exerted machining force if it deviates from the actually exerted machining force reference. The term "automatic" in the sense of present invention means without the interaction of a human technician. An exceeding machining force is automatically corrected by means of a purpose-determined correction deflection of the device. It is the correction deflection, that is used to automatically create a corrected drive control signal to fully or partially reduce the correction deflection.

Present invention also relates to a device adapted to perform the method to ascertain a quality of a product obtained by subtractive manufacturing, wherein said device comprises a sensor device that measures said actually exerted machining force, said sensor device measures at least three components of said actually exerted machining force, a horizontal component of said components acts along a horizontal axis, a transverse component of said components acts along a transverse axis, and a vertical component of said components acts along a vertical axis; and said sensor device creates at least one sensor signal for said measured actually exerted machining force.

The device of present invention differs in at least one respect from WO2013043102A1, in that not only a normal component of the actually exerted machining force is measured, but that three components of the actually exerted machining force are measured, which is a more accurate measurement.

BRIEF DESCRIPTION OF THE DRAWINGS

In the following, the invention will be described more in detail, by way of examples referring to the figures, in which.

Like reference numerals refer to like elements throughout.

DETAILED DESCRIPTION OF THE EMBODIMENTS OF THE INVENTION

Figure 1:
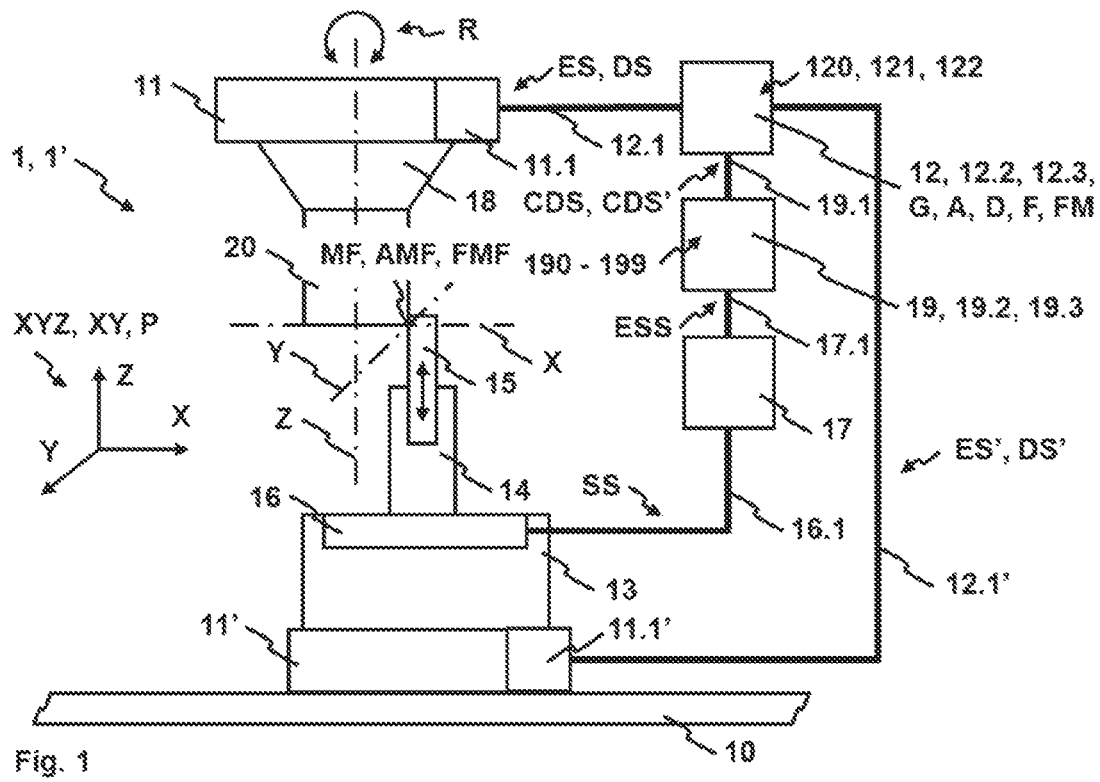
FIG. 1 schematically shows a view of a part of a device 1 according to the invention in the embodiment of a turning device 1'.
Figure 2:
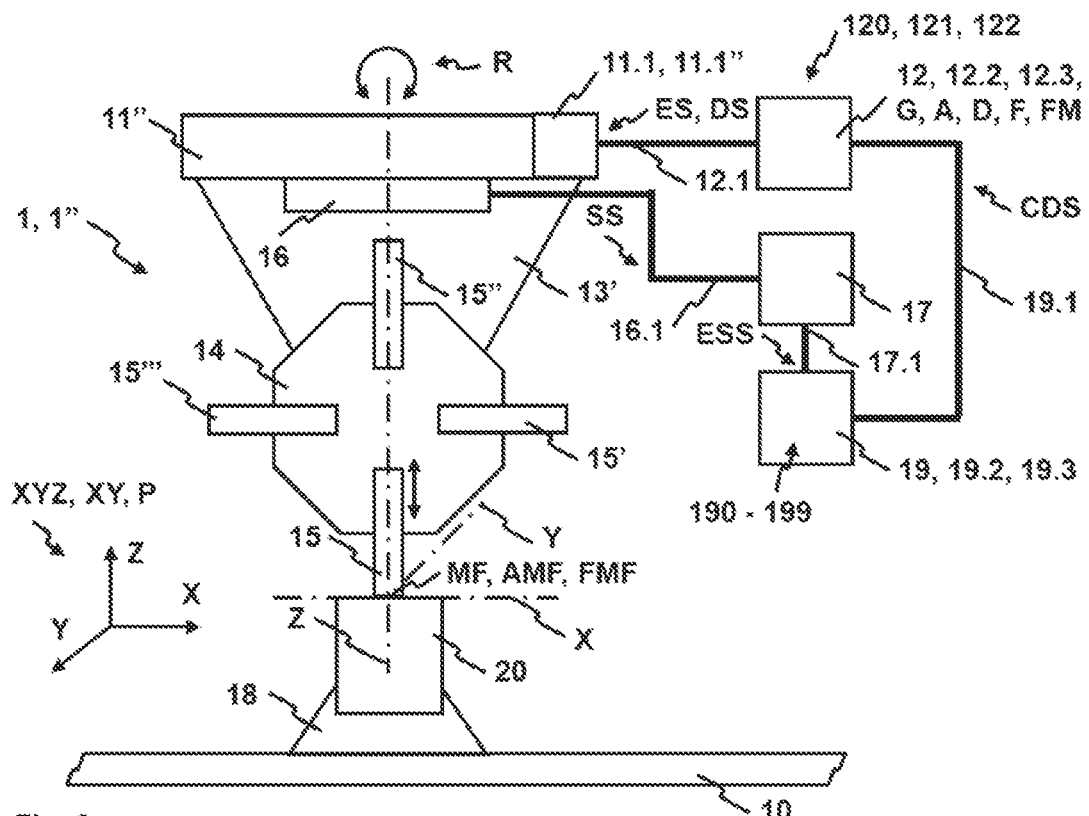
FIG. 2 schematically shows a view of a part of a device 1 according to the invention in the embodiment of a drilling device 1"
Figure 3:
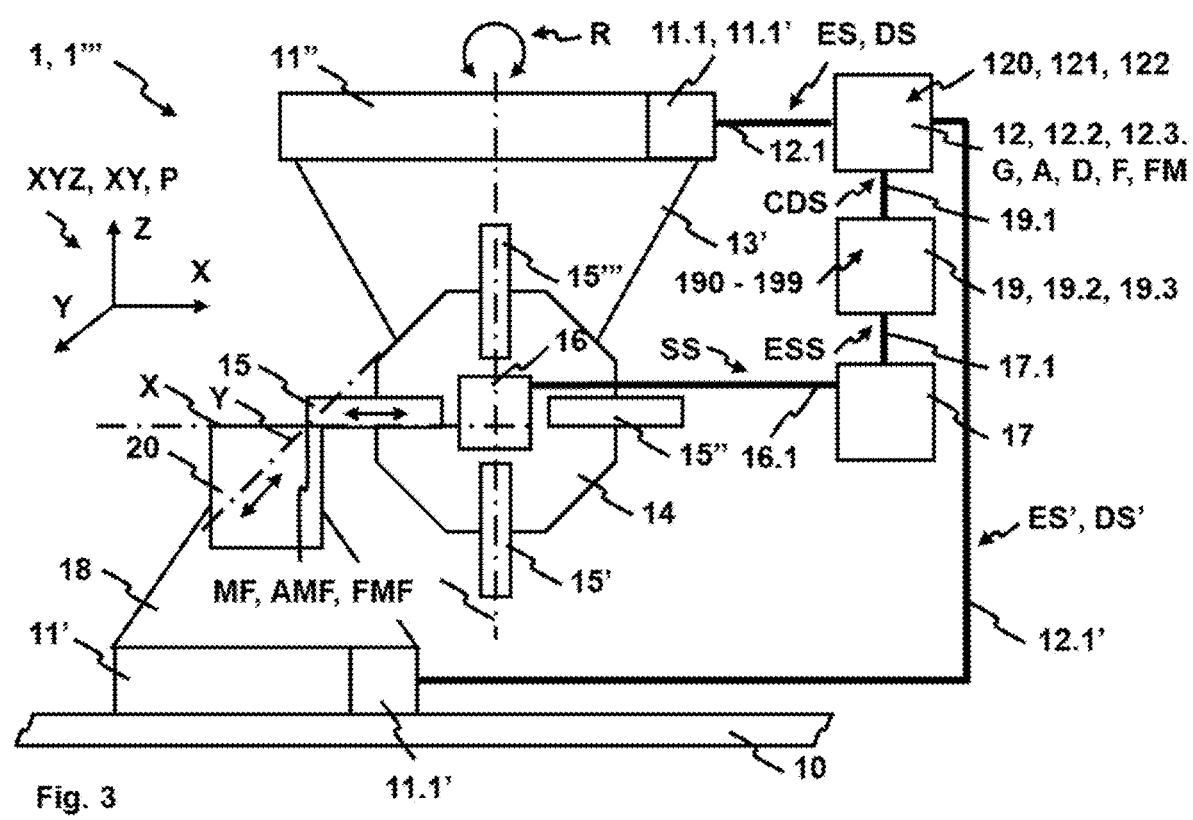
FIG. 3 schematically shows a view of a part of a device 1 according to the invention in the embodiment of a milling device 1'"

FIGS. 1-3 show schematic representations of three embodiments of a device 1 of present invention. The device 1 is a CNC machine device. FIG. 1 relates to a device 1 in the embodiment of a turning device 1'. FIG. 2 relates to a device 1 in the embodiment of a drilling device 1". FIG. 3 relates to a device 1 in the embodiment of a milling device 1'".

The device 1 is shown in a three-dimensional coordinate system XYZ with three orthogonal coordinates or axes, i.e., a horizontal axis X oriented left to right across the page, a transverse axis Y oriented perpendicular to the page, and a vertical axis Z oriented from top to bottom of the page.

The device 1 comprises a base, 10 and a workpiece holder 18. Base 10 and workpiece holder 18 are made from materials that provide good resistance to plastic deformation, such as metals, alloys, etc. Usually, the base 10 is a massive and heavy casting, that provides high stiffness to the device 1 and that supports most of the elements of the device 1. The workpiece holder 18 holds a workpiece 20. According to FIG. 1, the workpiece holder 18 is a chuck. According to the FIGS. 2 and 3, the workpiece holder 18 is a table.

The workpiece 20 is shaped by controlled material-removal into a product. The workpiece 20 may be from arbitrary material, that can be shaped by material removal into a product. Typical workpiece material is metal, plastic, wood, etc. or a combination of at least two of metal, plastic, wood, etc.

The device 1 comprises a cutting tool holder 14 and at least one cutting tool 15, 15', 15", 15'". The cutting tool holder 14 is made from materials that provide good resistance to plastic deformation, such as metals, alloys, etc. The cutting tool holder 14 holds the at least one cutting tool 15, 15', 15", 15'". According to FIG. 1, the cutting tool holder 14 holds a single cutting tool 15. According to the FIGS. 2 and 3, the cutting tool holder 14 holds four cutting tools 15, 15', 15", 15'". The person of ordinary skill in the art may practice the present invention with a cutting tool holder that holds more or fewer than four cutting tools.

Each of the cutting tools 15, 15', 15", 15'" is made from one or more materials that provide good resistance to plastic deformation and thermal and mechanical shock, such as high carbon steels, non-ferrous cast alloys, cemented carbides, ceramics and sintered oxides, cermets, diamonds, cubic boron nitrides, etc. According to FIG. 1, the cutting tool 15 is from a family of tools that includes a turning tool, a necking tool, a threading tool, etc. According to FIG. 2, the cutting tool 15, 15', 15", 15'" is from a family of tools that includes a drill, a boring tool, a reamer, etc. According to FIG. 3, the cutting tool 15, 15', 15", 15'" is from a family of tools that includes a cutter, a drill, a broaching bit, etc.

The device 1 comprises at least one of a cutting tool post 13 and a cutting tool chuck 13'. The cutting tool post 13 and the cutting tool chuck 13' are made from materials that provide good resistance to plastic deformation, such as metals, alloys, etc. According to FIG. 1, the cutting tool post 13 rigidly clamps the cutting tool holder 14. According to the FIGS. 2 and 3, the cutting tool chuck 13' rigidly clamps the cutting tool holder 14. The rigid clamping of the cutting tool holder 14 may be released temporarily to rotate the cutting tool holder 14 with respect to the cutting tool chuck 13' to selectively arrange one of the cutting tools 15, 15', 15", 15'" in a machining position next to the workpiece 20. Once the selection of a cutting tool 15, 15', 15", 15'" is done, then the cutting tool chuck 13' again rigidly clamps the cutting tool holder 14. According to the view schematically shown in FIGS. 1-3, the cutting tool 15 is selected and arranged in a machining position next to the workpiece 20.

The device 1 comprises a drive control unit 12 and at least one drive unit 11, 11', 11". The drive control unit 12 controls each of the drive units 11, 11', 11". Each of the drive units 11, 11', 11" is an electric machine for driving the workpiece holder 18 and/or the cutting tool holder 14. The expression "and/or" has the meaning of the Boolean conjunction operator "and" as well as the meaning of the Boolean disjunction operator "or". A first drive unit 11 provides a rotation movement around a primary axis. A second drive unit 11' provides a feed movement along at least one further axis. A third drive unit 11" provides a rotation movement around a primary axis and a feed movement along a further axis. The rotation movement is represented schematically by a double-sided curved arrow around the primary axis. The feed movement is represented by a double-sided straight arrow along the further axis.

For the turning device 1' according to FIG. 1, a first drive unit 11 positions the workpiece holder 18 in the three-dimensional coordinate system XYZ and rotates the workpiece holder 18 around the vertical axis Z as the primary axis. A second drive unit 11' positions the cutting tool holder 14 in the three-dimensional coordinate system XYZ and is feeding the cutting tool holder 14 along the vertical axis Z as the further axis. The person of ordinary skill in the art may practice present invention with a turning device that is feeding a cutting tool holder 14 along more than one further axis that is parallel to the Z axis.

For the drilling device 1" according to FIG. 2, a third drive unit 11" positions the cutting tool holder 14 in the three-dimensional coordinate system XYZ. The third drive unit 11" rotates the cutting tool holder 14 around the vertical axis Z as the primary axis and is feeding the cutting tool holder 14 along the vertical axis Z as the further axis.

For the milling device 1'" according to FIG. 3, a third drive unit 11" positions the cutting tool holder 14 in the three-dimensional coordinate system XYZ. The third drive unit 11" rotates the cutting tool holder 14 around the vertical axis Z as the primary axis and is feeding the cutting tool holder 14 along the horizontal axis X as a first further axis. And a second drive unit 11' positions the workpiece holder 18 in the three-dimensional coordinate system XYZ and is feeding the workpiece holder 18 along the transverse axis Y as a second further axis. The person of ordinary skill in the art may practice the present invention with a milling device that is feeding a cutting tool holder 14 along more than one further axis and that is feeding a workpiece holder 18 along more than one further axis.

The device 1 for subtractive manufacturing in accordance with the of present invention thus may assume a configuration as a turning device 1', a drilling device 1" or a milling device 1'". Whereas a device configured in accord with WO2013043102A1 is limited to functioning for a turning device to perform subtractive manufacturing.

As schematically shown in FIG. 1 for example, the drive unit 11, 11', 11" comprises at least one encoder 11.1, 11.1", which may be a rotary encoder 11.1 or a linear encoder 11.1'. The first drive unit 11 has a rotary encoder 11.1, the second drive unit 11' has a linear encoder 11.1', and the third drive unit 11" has a rotary encoder 11.1 and a linear encoder 11.1'. The encoder 11.1, 11.1' measures a position P of the workpiece 20 and/or a position P of the selected cutting tool 15. Preferably, the position P of the workpiece 20 and/or a position P of the selected cutting tool 15 is an absolute position of the workpiece 20 and/or the selected cutting tool 15 with respect to a reference position of the three-dimensional coordinate system XYZ. Preferably, the rotary encoder 11.1 measures the position P of the workpiece 20 and/or the position P of the selected cutting tool 15 with a resolution of 0.001°. Preferably, the linear encoder 11.1' measures the position P of the selected cutting tool 15 with a resolution of 0.2 µm. For a measured position P of the workpiece 20 and/or the position P of the selected cutting tool 15, the encoder 11.1, 11.1' creates at least one encoder signal ES, ES'. The encoder 11.1, 11.1' transmits the encoder signal ES, ES' to the drive control unit 12 by means of at least one drive control unit line 12.1, 12.1', such as a signal cable schematically shown in FIG. 1 for example.

As schematically shown in FIG. 1 for example, the drive control unit 12 desirably is a computer with a processor device 12.2 and a memory device 12.3. The memory device 12.3 desirably is a computer readable memory device. The drive control unit 12 has at least one drive control program product 120. The drive control program product 120 is executed by the processor device 12.2 of the drive control unit 12. The drive control unit 12 uses design data 121 of a digital design of the product. The digital design represents the product to be obtained by subtractive manufacturing. Preferably, the digital design is a three-dimensional representation of the product. The digital design desirably is a computer-aided design (CAD) of the product. Preferably, the design data 121 of the product are stored in the memory device 12.3 of the drive control unit 12.

Alternatively, instead of using a CAD as the digital design, the drive control program product 120 is configured to operate on design data 121 that a user may input into the drive control unit 12.

The drive control program product 120 reads the design data 121 and accordingly performs computer-aided manufacturing (CAM) of the product in compliance with the design data 121 that the drive control program product 120 has read.

Preferably, from the design data 121 the drive control computer program product 120 automatically determines product feature data, such as a curvature, a pocket, etc. Preferably, from the design data 121 the drive control program product 120 automatically determines product attribute data. The product attribute data are a physical characteristic of the product feature, such as location, a diameter, etc. Preferably, from the design data 121, the drive control program product 120 automatically determines product quality data. The product quality data are a physical requirement of the product feature, such as a dimensional accuracy, a surface roughness, etc.

Alternatively, instead of an automatic determination of product feature data, of product attribute data and of product quality data by means of the drive control program product 120, the drive control program product 120 is configured to operate on product feature data, product attribute data and product quality data that a user may input into the drive control unit 12.

The drive control unit 12 uses manufacturing process data 122 of at least one manufacturing process. Each product feature is associated with at least one manufacturing process. Preferably, the manufacturing process data 122 are stored in the memory device 12.3 of the drive control unit 12. For each determined product feature data, the drive control program product 120 reads associated manufacturing process data 122.

Alternatively, instead of the drive control program product 120 being configured for automatically reading associated manufacturing process data 122, the drive control program product 120 is configured to operate on manufacturing process data 122 that is determined by a user fora determined product feature and that the user inputs into the drive control program product 120.

Preferably, the drive control program product 120 modifies the manufacturing process data 122 according to the determined product attribute data and according to the determined product quality data. The result of this modification of the manufacturing process data 122 is at least one drive control signal DS, DS' schematically shown in FIG. 1 for example.

Alternatively, instead of an automatic modification of manufacturing process data 122 by means of the drive control program product 120, a user may modify the manufacturing process according to the determined product attribute and according to the determined product quality by the input of modified manufacturing process data into the drive control program product 120. The result of this modification of the manufacturing process data 122 is at least one drive control signal DS, DS'.

By means of the drive control signal DS, DS', the drive control unit 12 controls the drive unit 11, 11', 11". Preferably, the drive control unit 12 is a closed-loop controller, such as a proportional-integral-derivative (PID) controller, etc. The closed-loop controller employs a control loop to read at least one process value such as an encoder signal ES, ES', etc. The closed loop controller compares the read process value with a set point and determines a difference between the read process value and the set point. Based on the determined difference, the closed loop controller generates control signals DS, DS'. The drive control unit 12 generates drive control signals DS, DS' with an interpolation (IPO) cycle that is in the range of 3 msec to 30 msec. The drive control signal DS, DS' is at least one of:

- the position P of the selected cutting tool 15, the position P of the selected cutting tool 15 may be a past position, an actual position or a future position;
- the position P of the workpiece 20, the position P of the workpiece 20 may be a past position, an actual position or a future position;
- a shape of the workpiece 20 to be obtained at the end of the actual manufacturing process, defined by a cloud of surface points that are arranged with respect to a reference position of the three-dimensional coordinate system XYZ;
- a shape tolerance of the workpiece 20 to be obtained at the end of the actual manufacturing process, defined by a cloud of tolerance points that are arranged with respect to a reference position of the three-dimensional coordinate system XYZ;
- the rotation movement R, defined as the speed at which the workpiece 20 or the selected cutting tool 15 rotates around a primary axis;
- the feed movement FM, defined as the speed at which the selected cutting tool 15 advances along a further axis;
- a cutting speed, defined as the speed at which material is removed by the selected cutting tool 15 from the workpiece 20, the cutting speed is the speed difference between the rotational movement and the feed movement;
- a depth of cut D, defined as the depth of penetration of the selected cutting tool 15 into the workpiece 20;
- a gain G, defined as a positioning accuracy of the driven workpiece 20 and/or the selected cutting tool 15, the gain G is the difference between the read process value and the setpoint; accordingly, the device 1 has a position error between the setpoint and the actual position of the workpiece 20 and/or the actual position of the selected cutting tool 15;
- an amplification A of the read process value, the higher the amplification A, the faster a new setpoint is reached; accordingly, the closed-loop controller employs a kv-factor that is the ratio of a control loop velocity and the position error, the larger the kv-factor is, the higher the amplification A is and the faster a given position error is reduced to zero; for large kv-factors, the device 1 has a tendency to oscillate, which device oscillations result in oscillations of the read process value; and
- a filter F of the read process value, the filter F is used to remove frequencies of the read process value, the filter F is at least one of a low pass filter, a high pass filter, etc.; accordingly, the closed-loop controller uses the filter F to remove frequencies of oscillations of the read process value.

The drive control unit 12 transmits the drive control signal DS, DS' to the drive unit 11, 11', 11" by means of the drive control unit line 12.1, 12.1' as schematically shown in FIG. 1 for example.

Subtractive manufacturing of a product is done by controlled material-removal from the workpiece 20. Usually, subtractive manufacturing involves a plurality of manufacturing processes that are sequentially performed by means of a plurality of cutting tools 15, 15', 15", 15'''. In each manufacturing process, and according to the drive control signal DS, DS', a mechanical contact is established and maintained between the selected cutting tool 15 and the workpiece 20. During the mechanical contact, the selected cutting tool 15 exerts a machining force MF on the workpiece 20 and removes material from the workpiece 20 to obtain a product. Different cutting tools 15, 15', 15", 15'" exert different machining forces MF on the workpiece 20.

As schematically shown in FIG. 1 for example, the device 1 comprises a sensor device 16 and a sensor evaluation unit 17. The sensor device 16 may be a force sensor and/or a torque sensor. The sensor device 16 may be a piezoelectric sensor, a piezoresistive sensor, a strain gauge, etc. The sensor device 16 measures the machining force MF. The sensor device 16 measures at least one of a horizontal component CX, a transverse component CY, and a vertical component CZ of the machining force MF. The horizontal component CX acts along the horizontal axis X, the transverse component CY acts along the transverse axis Y, and the vertical component CZ acts along the vertical axis Z. For a measured machining force MF, the sensor device 16 creates at least one sensor signal SS. Preferably, a strength of the sensor signal SS is proportional to a magnitude of the machining force MF. Preferably, the sensor device 16 measures the machining force MF dynamically with a measurement frequency of at least $10^4$ Hz. Preferably, the sensor device 16 is configured with the capability of measuring the machining force MF in a measuring range between 50N and 1000N.

For a high sensitivity, the sensor device 16 is arranged as near as possible to the cutting tool 15, 15', 15", 15'". Sensitivity is defined as the ratio of the magnitude of the machining force MF to the strength of the sensor signal SS. According to FIG. 1, the sensor device 16 is arranged in the cutting tool post 13, that rigidly clamps the cutting tool holder 14. According to FIG. 2, the sensor device 16 is arranged in the cutting tool chuck 13', that rigidly clamps the cutting tool holder 14. According to FIG. 3, the sensor device 16 is arranged in the cutting tool holder 14.

As schematically shown in each of FIGS. 1-3, the sensor device 16 transmits the sensor signal SS to the sensor evaluation unit 17 by means of at least one sensor device line 16.1, such as a signal cable.

The sensor evaluation unit 17 performs at least one of the following operations with the sensor signal SS: amplification, filtering and digitization. As schematically shown in each of FIGS. 1-3, the result of this operation performance of the sensor signal SS is at least one evaluated sensor signal ESS.

Figure 4:
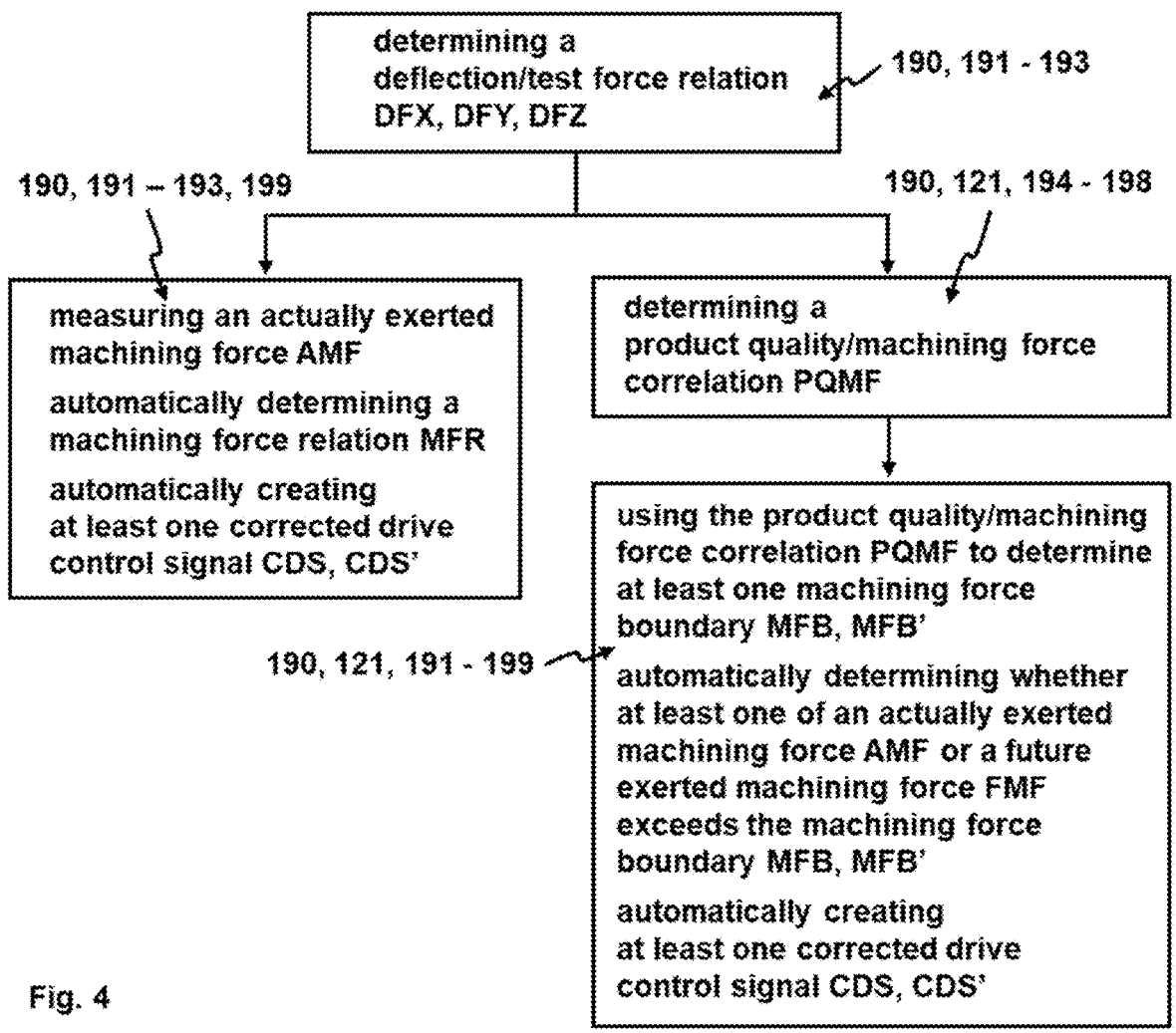
FIG. 4 is a flow chart with a first step I, a second step II, a third step III, and a fourth step IV of the method according to the invention.

FIG. 4 is a flow chart with a first step I, a second step II, a third step III, and a fourth step IV of the method according to the invention. The first step I is completed temporally before the beginning of the second step II or the fourth step IV. The third step III may be completed temporally before the beginning of the second step II or of the fourth step IV.

First Step I

The first step I relates to the determination of at least one deflection/test force relation DFX, DFY, DFZ. According to the FIGS. 5-7, at least one deflection measurement of the device 1 is taken and at least one test force TF and at least one deflection D15 are measured. The deflection measurement is performed by a force actuator 31 and a deflection sensor 32.

The force actuator 31 may be a piezoelectric actuator, a servomotor, etc. Preferably, the force actuator 31 is a linear actuator that can apply the test force TF along an axis in a range between 10N and 1000N. Preferably, the force actuator 31 applies a rampant series of test forces TF. For the applied test force TF, the force actuator 31 creates at least one actuator signal AS.

The deflection sensor 32 may be a linear variable differential transformer (LVDT), a laser displacement sensor, etc. The deflection sensor 32 measures a deflection D15 of the selected cutting tool 15. Preferably, the deflection sensor 32 measures the deflection D15 along an axis in a range of 1 μm to 1 mm with a resolution of 0.01 μm. Preferably, the deflection sensor 32 measures a series of deflections D15. For a measured deflection D15, the deflection sensor 32 creates at least one deflection signal FS. Preferably, a strength of the deflection signal D15 is proportional to a magnitude of the test force TF.

The device 1 comprises a control unit 19. The control unit 19 is a computer with a processor device 19.2 and a memory device 19.3. The memory device 19.3 is a computer readable memory device.

The force actuator 31 transmits the actuator signal AS to the control unit 19 by means of at least one force actuator line 31.1, such as a signal cable. The control unit 19 makes the actuator signal AS available as digital test force data 191. Preferably, test force data 191 are stored in the memory device 19.3 of the control unit 19.

The deflection sensor 32 transmits the deflection signal FS to the control unit 19 by means of at least one deflection sensor line 32.1, such as a signal cable. The control unit 19 makes the deflection signal FS available as digital deflection data 192. Preferably, deflection signal data 192 are stored in the memory device 19.3 of the control unit 19.

Figure 5:
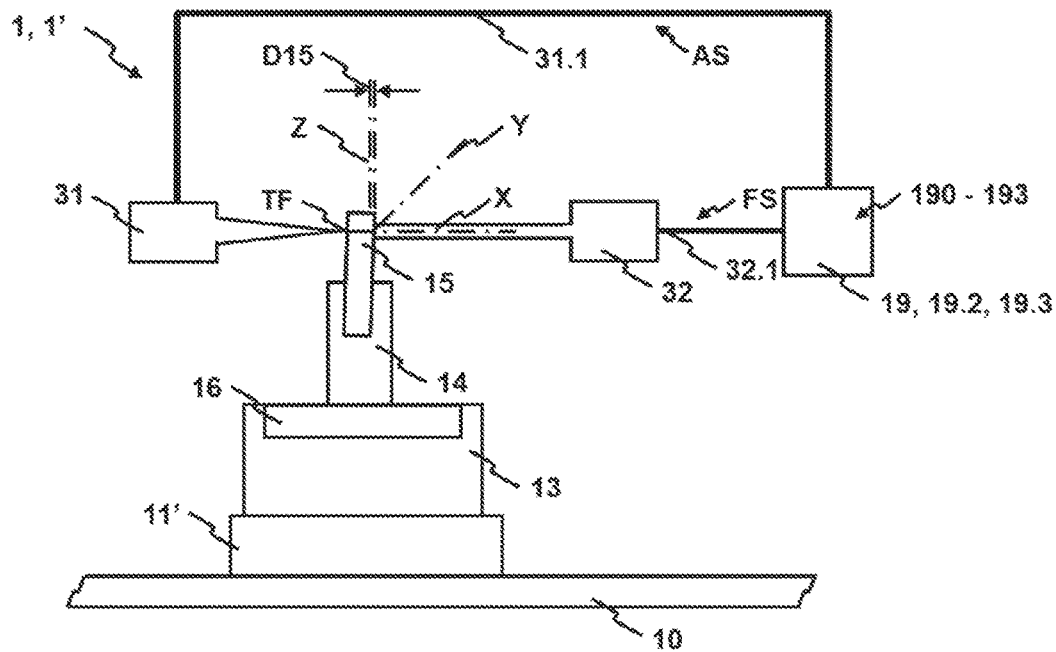
FIG. 5 schematically shows a view of a part of the turning device 1' of FIG. 1 during a deflection measurement of a cutting tool 15.

FIG. 5 shows the deflection measurement of the device 1 in the embodiment of a turning device 1' according to FIG. 1. The force actuator 31 applies a test force TF along the horizontal axis X to the selected cutting tool 15. For this purpose, the force actuator 31 mechanically contacts a first side of the selected cutting tool 15 and the deflection sensor 32 mechanically contacts a second side of the selected cutting tool 15. With respect to the vertical axis Z, the second side of the selected cutting tool 15 is opposite to the first side of the selected cutting tool 15. As a reaction to the applied test force TF, the device 1 is displaced and a deflection D15 of the selected cutting tool 15 along the horizontal axis X is measured by the deflection sensor 32.

Figure 6:
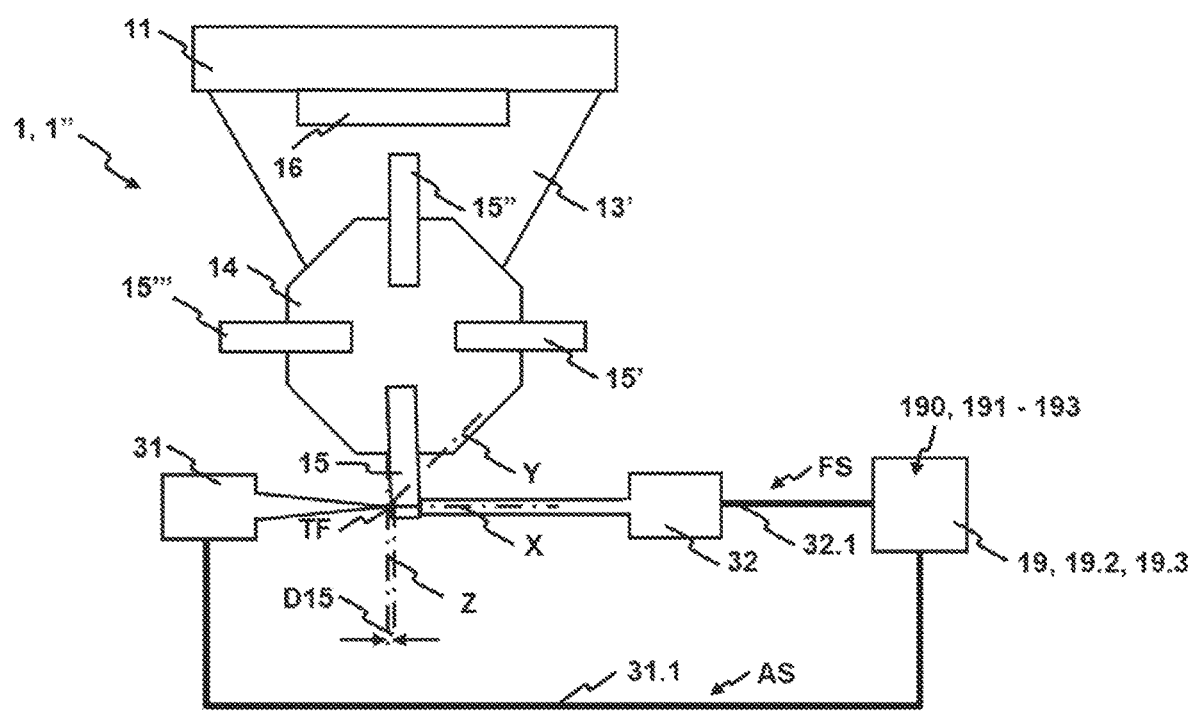
FIG. 6 schematically shows a view of a part of the drilling device 1" of FIG. 2 during a deflection measurement of a cutting tool 15.

FIG. 6 shows the deflection measurement of the device 1 in the embodiment of a drilling device 1" according to FIG. 2. The force actuator 31 applies a test force TF along the horizontal axis X to the selected cutting tool 15. For this purpose, the force actuator 31 mechanically contacts a first side of the selected cutting tool 15 and the deflection sensor 32 mechanically contacts a second side of the selected cutting tool 15. With respect to the vertical axis Z, the second side of the selected cutting tool 15 is opposite to the first side of the selected cutting tool 15. As a reaction to the applied test force TF, the device 1 is displaced and a deflection D15 of the selected cutting tool 15 along the horizontal axis X is measured by the deflection sensor 32.

Figure 7:
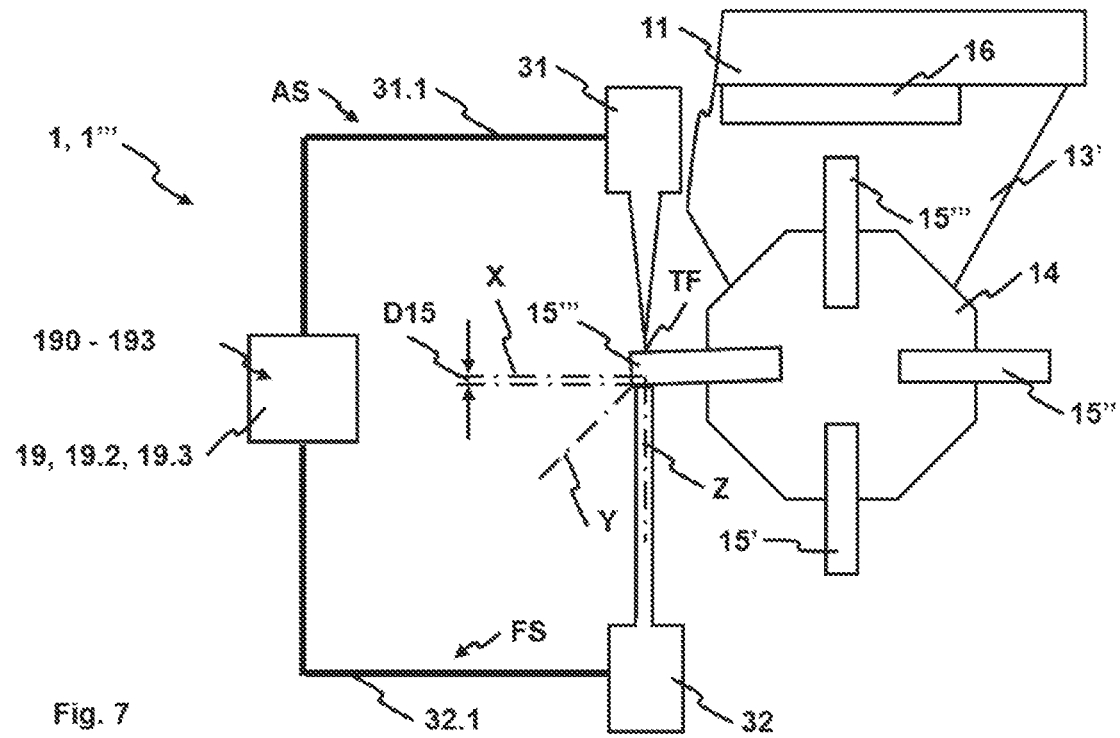
FIG. 7 schematically shows a view of a part of the milling device 1'" of FIG. 3 during a deflection measurement of a cutting tool 15.

FIG. 7 shows the deflection measurement of the device 1 in the embodiment of a milling device 1'" according to FIG. 3. The force actuator 31 applies a test force TF along the vertical axis Z to the selected cutting tool 15. For this purpose, the force actuator 31 mechanically contacts a first side of the selected cutting tool 15 and the deflection sensor 32 mechanically contacts a second side of the selected cutting tool 15. With respect to the horizontal axis X, the second side of the selected cutting tool 15 is opposite to the first side of the selected cutting tool 15. As a reaction to the applied test force TF, the device 1 is displaced and a deflection D15 of the selected cutting tool 15 along the vertical axis Z is measured by the deflection sensor 32.

Preferably, the deflection measurement of the device 1 is performed along all axes of the three-dimensional coordinate system XYZ. The deflection measurement yields a horizontal deflection distance ΔX along the horizontal axis X, a transverse deflection distance ΔY along the transverse axis Y and vertical deflection distance ΔZ along the vertical axis Z. Thus, the device 1 of present invention differs with respect to WO2013043102A1, where a deflection measurement is made only for a normal force.

The control unit 19 has at least one control program product 190, the control program product 190 is executed by the processor device 19.2 of the control unit 19. The control program product 190 reads the test force data 191 and the deflection data 192. The control program product 190 plots the test force data 191 and the deflection data 192. The resulting graphs are shown in the FIGS. 8 and 9. On the abscissa of FIG. 8, a horizontal deflection distance ΔX is indicated in micrometers (μm). On the abscissa of FIG. 9, a vertical deflection distance ΔZ is indicated in μm. On the ordinate of each of FIG. 8 and FIG. 9, the test force TF is indicated in Newtons. As schematically shown in each of FIG. 8 and FIG. 9, the deflection D15 has a linear relationship with respect to the applied test force TF. However, the slope of the graphs is different for each deflection D15. The person of ordinary skill in the art may realize that the present invention can be practiced with a deflection that has a non-linear relationship, such as a J-shaped relationship, an S-shaped relationship, etc.

Figure 8:
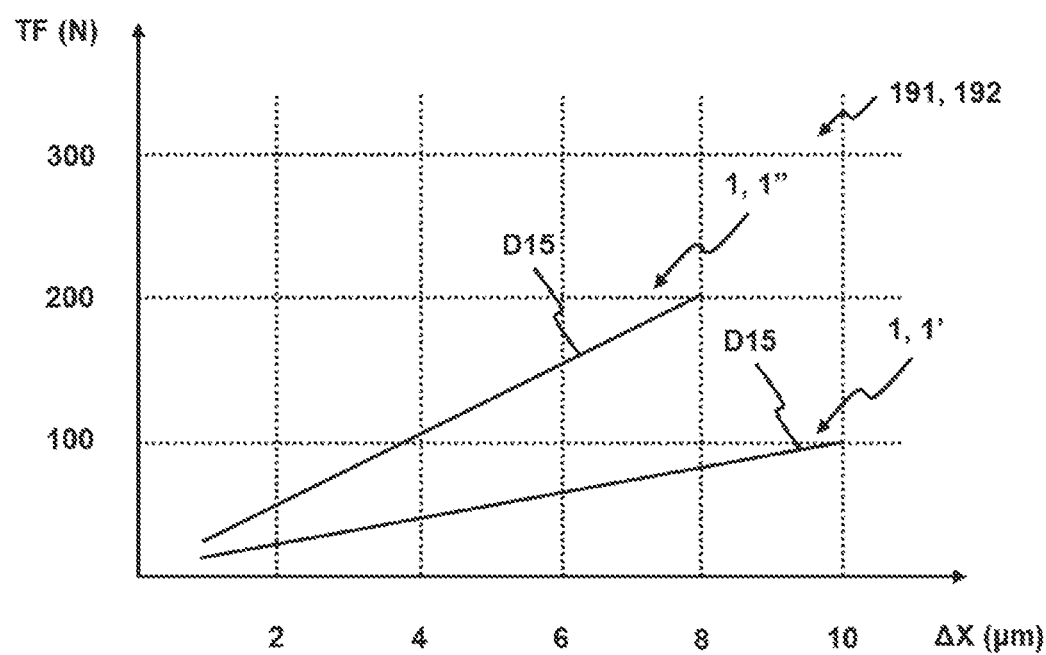
FIG. 8 represents a graph of deflections D15 of the turning device 1' of FIG. 1 and of the drilling device 1" of FIG. 2, the deflections D15 have been obtained from the deflection measurements of the FIGS. 5 and 6.

FIG. 8 shows a graph of the deflection D15 of the turning device 1' of FIG. 1 and a graph of the deflection D15 of the drilling device 1" of FIG. 2. The deflection D15 of the turning device 1' shows a horizontal deflection distance ΔX of 10 μm for a test force TF of 100N. The deflection D15 of the drilling device 1" shows a horizontal deflection distance ΔX of 8 μm for a test force TF of 200N.

Figures 9, 10:
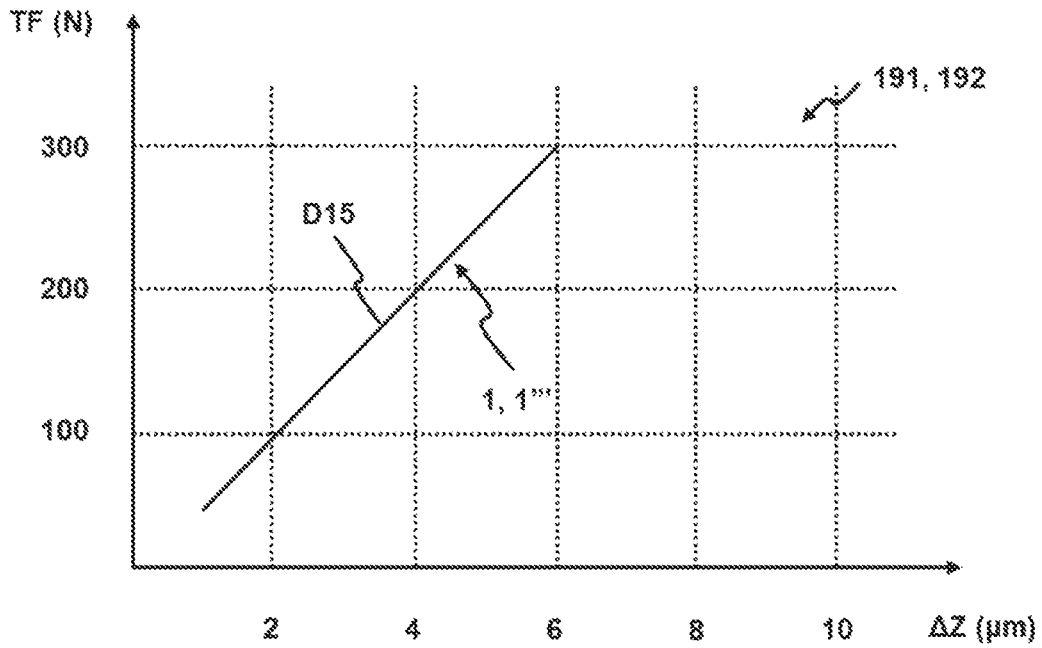
FIG. 9 represents a graph of a deflection D15 of the milling device 1'" of FIG. 3, the deflection D15 has been obtained from the deflection measurements of FIG. 7.
FIG. 10 summarizes in a table deflection/test force relations DFX, DFY, DFZ determined from the FIGS. 8 and 9.

FIG. 9 shows a graph of the deflection D15 of the milling device 1''' of FIG. 3. The deflection 15 shows a vertical deflection distance ΔZ of 6 μm for a test force TF of 300N.

FIG. 10 is a table that summarizes deflection/test force relations DTX, DTY, DTZ of deflections D15 from the FIGS. 5-7. A first column of the table indicates the embodiment of the device 1. A second column of the table indicates the applied maximum test force TF. A third column of the table indicates a horizontal deflection distance ΔX of the deflection D15 obtained for the applied test force TF. A fourth column of the table indicates a transverse deflection distance ΔY of the deflection D15 obtained for the applied test force TF. A fifth column of the table indicates a vertical deflection distance ΔZ of the deflection D15 obtained for the applied test force TF. A sixth column of the table indicates a horizontal deflection/test force relation DFX for standard unit of the test force TF of 1N. A seventh column of the table indicates a transverse deflection/test force relation DFY for standard unit of the test force TF of 1N. An eighth column of the table indicates a vertical deflection/test force relation DFX for standard unit of the test force TF of 1N.

The deflection/test force relations DTX, DTY, DTZ are factors. The deflection/test force relations DTX, DTY, DTZ are made available as digital deflection/test force data 193. Preferably, deflection/test force data 193 are stored in the memory device 19.3 of the control unit 19.

Second Step II

During subtractive machining, the actually exerted machining force AMF is measured by the sensor device 16. The term "actually" in the sense of present invention means in real-time, where an evaluated signal ESS that corresponds to an actually exerted machining force AMF is transmitted to the control unit 19 within a time of 0.1 msec, which is the inverse of the measurement frequency of the sensor device 16 of at least $10^4$ Hz. Thus, the term "actually" refers to a subtractive machining of a product 21 that actually takes place with a machining force AMF that is actually exerted.

For the device 1 schematically shown in any of the FIGS. 1-3, to establish and maintain a mechanical contact between the selected cutting tool 15 and the workpiece 20, the drive control unit 12 creates at least one drive control signal DS, DS' and transmits the respective drive control signal DS, DS' to the drive unit 11, 11', 11" via the encoder 11.1, 11.1', 11.1" of the device 1. During the ensuing mechanical contact between the selected cutting tool 15 and the workpiece 20, the selected cutting tool 15 actually exerts a machining force AMF on the workpiece 20 and removes material from the workpiece 20 to obtain a product.

As schematically shown in any of the FIGS. 1-3, the actually exerted machining force AMF is measured by the sensor device 16 and a corresponding sensor signal SS is created and transmitted to the sensor evaluation unit 17. The sensor evaluation unit 17 processes the sensor signal SS and generates a resulting evaluated sensor signal ESS. The sensor evaluation unit 17 transmits the evaluated sensor signal ESS to the control unit 19 by means of the sensor evaluation unit line 17.1. The control unit 19 stores the evaluated sensor signal ESS so that it becomes available as digital machining force data 195. The position P of the workpiece 20 and/or the selected cutting tool 15 is measured, and a corresponding encoder signal ES, ES' is created. The drive control unit 12 transmits the encoder signal ES, ES' to the control unit 19 by means of the control unit line 19.1. The control unit 19 stores the encoder signal ES, ES' so that it becomes available as digital position data 194.

The control program product 190 is configured to read the position data 194 and the machining force data 195. The control program product 190 is configured to plot the machining force data 195. The result of these operations of the control program product 190 is shown in the FIGS. 11-13 with plots of the actually exerted machining force AMF of the device 1 of one of the FIGS. 1-3 as an actually exerted machining force graph AMFG over a cutting tool time t. The cutting tool time t has a duration of approximately 20 sec. The actually exerted machining force AMF is indicated in components CX, CY, CZ. A horizontal component CX acts along the horizontal axis X of the actually exerted machining force AMF, a transverse component CY acts along the transverse axis Y of the actually exerted machining force AMF, and a vertical component CZ acts along the vertical axis Z of the actually exerted machining force AMF.

Figure 11:
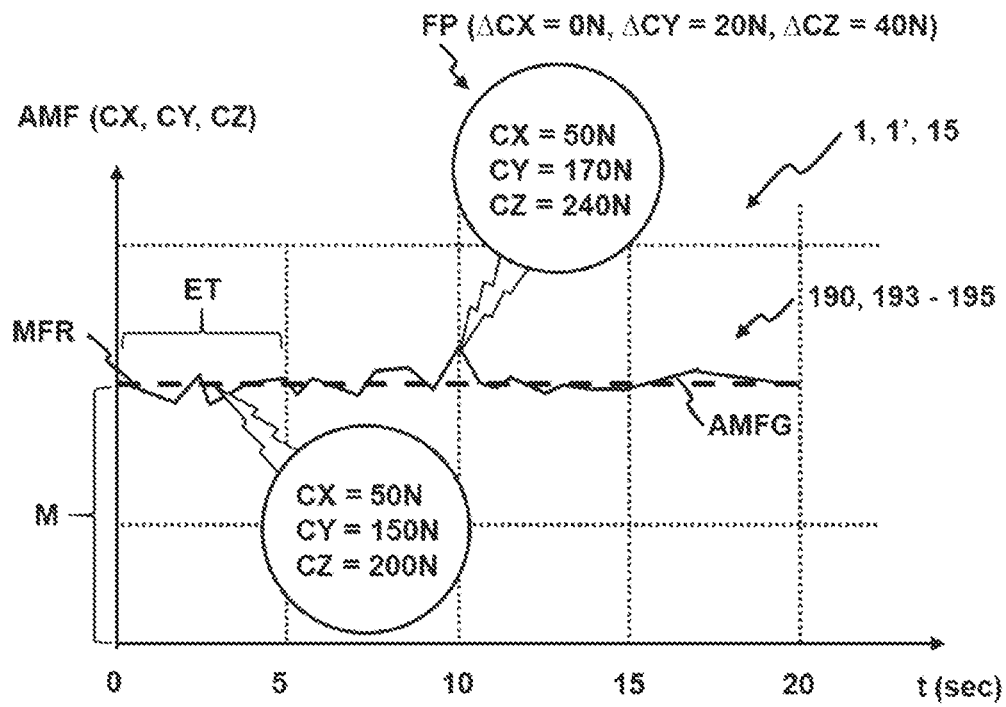
FIG. 11 schematically represents an actually exerted machining force AMF and a machining force reference MFR of the turning device 1' of FIG. 1.
Figure 12:
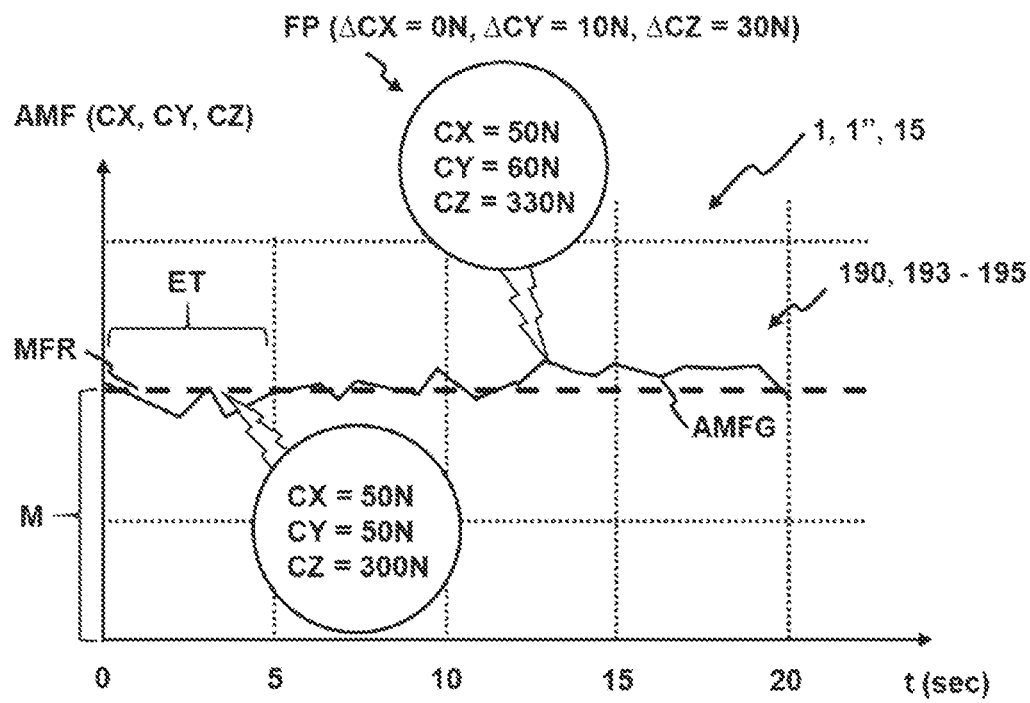
FIG. 12 schematically represents an actually exerted machining force AMF and a machining force reference MFR of the drilling device 1" of FIG. 2.
Figures 13, 14:
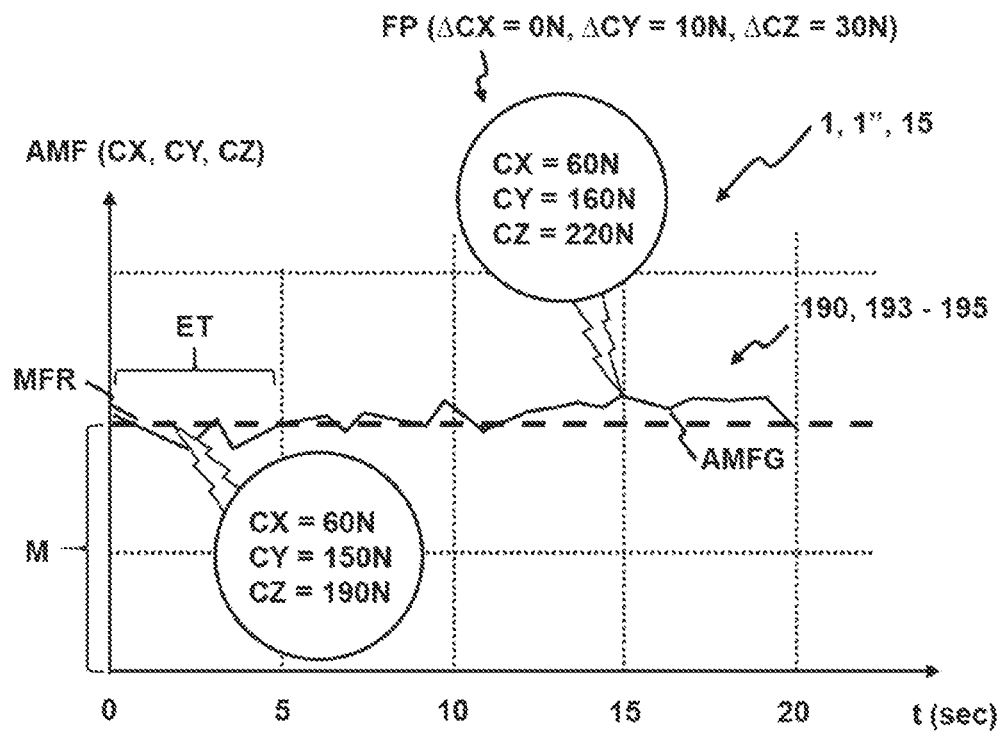
FIG. 13 schematically represents an actually exerted machining force AMF and a machining force reference MFR of the milling device 1'" of FIG. 3.
FIG. 14 summarizes in a table force portions FP determined from the FIGS. 11-13 and the deflection/test force relations DFX, DFY, DFZ from FIG. 10 for the device 1 of one of the FIGS. 1-3.

From the position data 194 and the machining force data 195, the control program product 190 is configured to use a magnitude M of the actually exerted machining force AMF that remains stable during an evaluation time ET as machining force reference MFR. According to the FIGS. 11-13 the evaluation time ET is an initial portion of 5 second duration of the cutting tool time t. During the evaluation time ET, the magnitude M remains stable. The term "stable" in the sense of present invention means constant within a margin of less than 10%, preferably less than 5%. The machining force reference MFR is represented in FIGS. 11-13 by a dotted line. From this disclosure, the person of ordinary skill in the art is informed that the present invention may be practiced with a shorter or longer evaluation time and with a more or less stable magnitude of the actually exerted machining force.

The control program product 190 is configured to evaluate whether the actually exerted machining force AMF deviates from the machining force reference MFR. According to FIG. 11 and for the turning device 1' of FIG. 1 and at a cutting tool time t=2.5 sec, the actually exerted machining force AMF equals the machining force reference MFR and comprises a horizontal component CX=50N, a transverse component CY=150N, and a vertical component CZ=200N. According to FIG. 12 and for the drilling device 1" of FIG. 2 and at a cutting tool time t=3 sec, the actually exerted machining force AMF equals the machining force reference MFR and comprises a horizontal component CX=50N, a transverse component CY=50N, and a vertical component CZ=300N. According to FIG. 13 and for the milling device 1''' of FIG. 3 and at a cutting tool time t=2 sec, the actually exerted machining force AMF equals the machining force reference MFR and comprises a horizontal component CX=60N, a transverse component CY=150N, and a vertical component CZ=190N.

The control program product 190 is configured to deem automatically that the product quality PQ of the product 21 is ascertained when the actually exerted machining force AMF does not deviate from the machining force reference MFR.

However, in the FIGS. 11-13 at a certain cutting tool time t, the actually exerted machining force AMF deviates from the machining force reference MFR. According to FIG. 11 and for the turning device 1' of FIG. 1 and at a cutting tool time t=10 sec, the actually exerted machining force AMF deviates from the machining force reference MFR and comprises a horizontal component CX=50N, a transverse component CY=170N, and a vertical component CZ=240N. According to FIG. 12 and for the drilling device 1" of FIG. 2 and at a cutting tool time t=13 sec, the actually exerted machining force AMF deviates from the machining force reference MFR and comprises a horizontal component CX=50N, a transverse component CY=60N, and a vertical component CZ=330N. According to FIG. 13 and for the milling device 1''' of FIG. 3 and at a cutting tool time t=15 sec, the actually exerted machining force AMF deviates from the machining force reference MFR and comprises a horizontal component CX=60N, a transverse component CY=160N, and a vertical component CZ=220N.

The control program product 190 is configured to detect a deviation of the actually exerted machining force AMF from the machining force reference MFR. For a detected deviation, the control program product 190 is configured to determine at least one force portion FP of the actually exerted machining force AMF that is subject to correction. According to FIG. 11 and for the turning device 1' of FIG. 1, the force portion FP has horizontal component portion ΔCX=0N, a transverse component portion ΔCY=20N and a vertical component portion ΔCZ=40N. According to FIG. 12 and for the drilling device 1" of FIG. 2, the force portion FP has a horizontal component portion ΔCX=0N, a transverse component portion ΔCY=10N and a vertical component portion ΔCZ=30N. According to FIG. 13 and for the milling device 1''' of FIG. 3, the force portion FP has a horizontal component portion ΔCX=0N, a transverse component portion ΔCY=10N and a vertical component portion ΔCZ=30N.

The control program product 190 is configured to read the deflection/test force data 193 and accordingly use the deflection/test force relation DFX, DFY, DFZ to determine for the determined force portion FP at least one correction deflection CDX, CDY, CDZ of the device 1.

FIG. 14 is a table that summarizes the determined force portions FP according to the graphical presentations of FIGS. 11-13 and the deflection/test force relations DFX, DFY, DFZ for a deflection D15 according to FIG. 10 of the device 1 of one of the FIGS. 1-3. A first column of the table indicates the embodiment of the device 1. A second column of the table indicates the horizontal component portion ΔCX of the forced portion FP. A third column of the table indicates the transverse component portion ΔCY of the force portion FP. A fourth column of the table indicates the vertical component portion ΔCZ of the forced portion FP. A fifth column of the table indicates a horizontal deflection/test force relation DFX of the deflection D15. A sixth column of the table indicates a transverse deflection/test force relation DFY of the deflection D15. A seventh column of the table indicates a vertical deflection/test force relation DFZ of the deflection D15. An eighth column of the table indicates a horizontal correction deflection CDX obtained by multiplication of the horizontal component portion ΔCX with the horizontal deflection/test force relation DFX. A ninth column of the table indicates a transverse correction deflection CDY obtained by multiplication of the transverse component portion ΔCY with the transverse deflection/test force relation DFY. A tenth column of the table indicates a vertical correction deflection CDZ obtained by multiplication of the vertical component portion ΔCZ with the vertical deflection/test force relation DFZ.

For the actually exerted machining force AMF according to FIG. 11 of the turning device 1' of FIG. 1, the horizontal component portion ΔCX=0N and thus, the control program product 190 determines a horizontal correction deflection CDX=0.00 µm. However, for the transverse component portion ΔCY=20N, the control program product 190 determines a transverse correction deflection CDY=2.00 µm. And for the vertical component portion ΔCZ=40N, the control program product 190 determines a vertical correction deflection CDY=1.60 µm.

For the actually exerted machining force AMF according to FIG. 12 of the drilling device 1" of FIG. 2, the horizontal component portion ΔCX=0N and thus, the control program product 190 determines a horizontal correction deflection CDX=0.00 µm. However, for the transverse component portion ΔCY=10N, the control program product 190 determines a transverse correction deflection CDY=0.80 µm. And for the vertical component portion ΔCZ=30N, the control program product 190 determines a vertical correction deflection CDY=0.75 µm.

For the actually exerted machining force AMF according to FIG. 13 of the milling device 1''' of FIG. 3, the horizontal component portion ΔCX=0N and the control program product 190 determines a horizontal correction deflection CDX=0.00 µm. For the transverse component portion ΔCY=10N, the control program product 190 determines a transverse correction deflection CDY=0.40 µm. And for the vertical component portion ΔCZ=30N, the control program product 190 determines a vertical correction deflection CDY=1.20 µm.

The control program product 190 is configured to use the determined correction deflection CDX, CDY, CDZ to create at least one corrected drive control signal CDS, CDS'. The drive control signal CDS, CDS' is at least one of a corrected position P of the selected cutting tool 15, a corrected position P of the workpiece 20, a corrected rotation movement R, a corrected feed movement FM, a corrected depth of cut D, a corrected gain G, a corrected amplification A, and a corrected filter F.

The corrected position P of the selected cutting tool 15 may fully or partially take account of the correction deflection CDX, CDY, CDZ. The selected cutting tool 15 may be repositioned in the three-dimensional coordinate system XYZ to fully or partially reduce the correction deflection CDX, CDY, CDZ. The corrected position P of the workpiece 20 may fully or partially take account of the correction deflection CDX, CDY, CDZ. The workpiece 20 may be repositioned in the three-dimensional coordinate system XYZ to fully or partially reduce the correction deflection CDX, CDY, CDZ.

The corrected rotation movement R may be a change in speed at which the workpiece 20 or the selected cutting tool 15 rotates around the primary axis. Due to this change in speed of rotation, the correction deflection CDX, CDY, CDZ is fully or partially reduced. The corrected feed movement FM may be a change in speed at which the selected cutting tool 15 advances along a further axis. Due to this change in speed of advancement, the correction deflection CDX, CDY, CDZ is fully or partially reduced.

The corrected depth of cut D may be a change in the depth of penetration of the selected cutting tool 15 into the workpiece 20. Due to this change in depth of penetration, the correction deflection CDX, CDY, CDZ is fully or partially reduced. The corrected gain G repositions the setpoint of the driven workpiece 20 and/or the driven selected cutting tool 15. The setpoint is repositioned in the three-dimensional coordinate system XYZ to fully or partially reduce the correction deflection CDX, CDY, CDZ.

The corrected amplification A changes the speed, with which a new setpoint is reached. The setpoint is reached at a changed speed in the three-dimensional coordinate system XYZ to fully or partially reduce the correction deflection CDX, CDY, CDZ. The corrected filter F changes the read process value that is used in the closed-loop control. The changed read process value that is used in the control loop fully or partially reduce the correction deflection CDX, CDY, CDZ.

By contrast to WO2013043102A1, where the cutting tool and the workpiece are maintained in a correct configuration and cutting depth, but without giving details on how this is done, present invention discloses a variety of corrected drive control signals CDS, CDS' to fully or partially reduce the correction deflection CDX, CDY, CDZ.

As schematically shown in FIGS. 1-3, the control unit 19 is configured to transmit the corrected drive control signal CDS, CDS' to the drive control unit 12 by means of the control unit line 19.1.

The drive control unit 12 uses the corrected drive control signal CDS, CDS' to fully or partially reduce the correction deflection CDX, CDY, CDZ. As a result, a corrected machining force CMF no longer deviates from the machining force reference MFR.

The drive control unit 12 may use the corrected drive control signal CDS, CDS' in the actual manufacturing process MP of a product 21 or in a future manufacturing process MP of a future product 21. In the actual manufacturing process MP, an actual machining force AMF is applied to the workpiece 20. In a future manufacturing process MP, a future machining force FMF is applied to the workpiece 20. Preferably, the control program product 190 is configured to evaluate whether for the corrected drive control signal CDS, CDS', at least one of an actually exerted machining force AMF or a future exerted machining force FMF deviates from the machining force reference MFR.

Third Step III

The third step III relates to the determination of a product quality/machining force correlation PQMF and may be completed temporally before the second step II. According to the FIGS. 15-17, the machining force MF that is exerted on a workpiece 20 with the device 1 of one of the FIGS. 1-3 is measured, and according to the FIGS. 19-21 at least one product quality PQ of a product 21 obtained by subtractive manufacturing of the workpiece 20 is measured.

For the device 1 of one of the FIGS. 1-3, the drive control unit 12 is configured to create at least one drive control signal DS, DS' to establish and maintain a mechanical contact between the selected cutting tool 15 and the workpiece 20. During the mechanical contact, the selected cutting tool 15 exerts a machining force MF on the workpiece 20 and removes material from the workpiece 20 to obtain a product.

As schematically shown in FIGS. 1-3, the machining force MF is measured by the sensor device 16, and a corresponding sensor signal SS is created. From the sensor signal SS results one evaluated sensor signal ESS. The sensor evaluation unit 17 transmits the evaluated sensor signal ESS to the control unit 19 by means of the sensor evaluation unit line 17.1. The control unit 19 makes the evaluated sensor signal ESS available as digital machining force data 195. The position P of the workpiece 20 and/or the selected cutting tool 15 is measured, and a corresponding encoder signal ES, ES' is created. The drive control unit 12 transmits the encoder signal ES, ES' to the control unit 19 by means of the control unit line 19.1. The control unit 19 makes the encoder signal ES, ES' available as digital position data 194.

The control program product 190 is configured to organize the position data 194 and the machining force data 195 into graphs of the position data 194 and the machining force data 195 as functions of time. The resulting machining force graphs MFG are represented in the FIGS. 15-17. The machining force MF is indicated in components CX, CY, CZ. A cutting tool time t is indicated in seconds. The cutting tool time t has a duration of approximatively 20 sec to 25 sec and represents a duration of a feed movement of a selected cutting tool 15.

Figure 15:
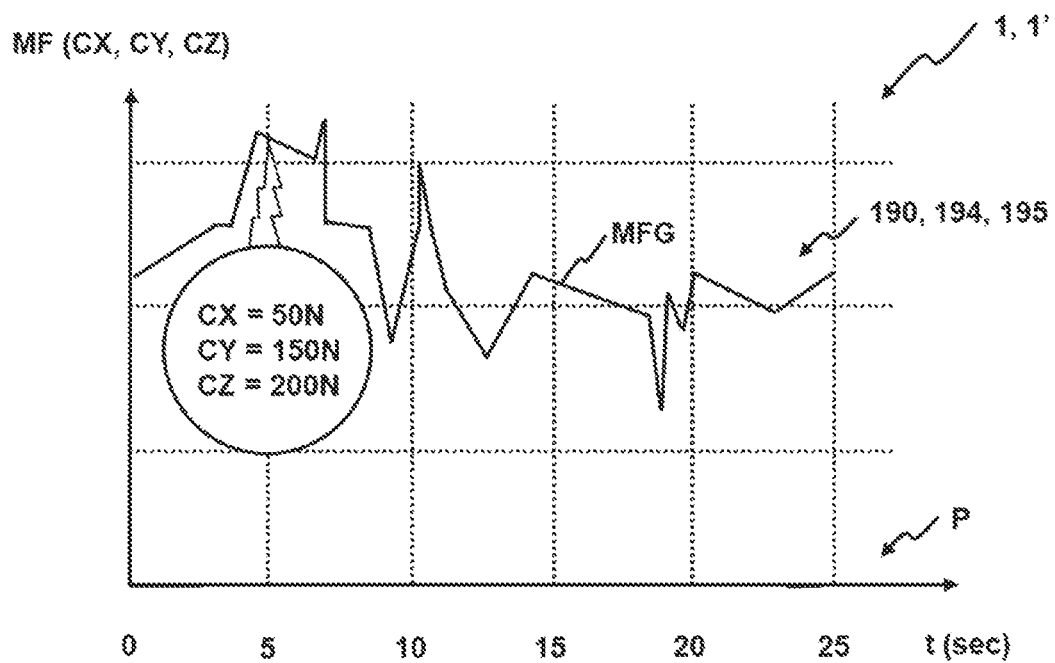
FIG. 15 schematically represents a machining force MF of the turning device 1' of FIG. 1.

According to FIG. 15, the machining force MF of the turning device 1' of FIG. 1 is plotted over the cutting tool time t, resulting in a machining force graph MFG. At a cutting tool time t=5 sec, the machining force MF comprises a horizontal component CX=50N, a transverse component CY=150N, and a vertical component CZ=200N. Later on, at a cutting tool time t=20 sec, a magnitude of the machining force MF decreases slightly.

Figure 16:
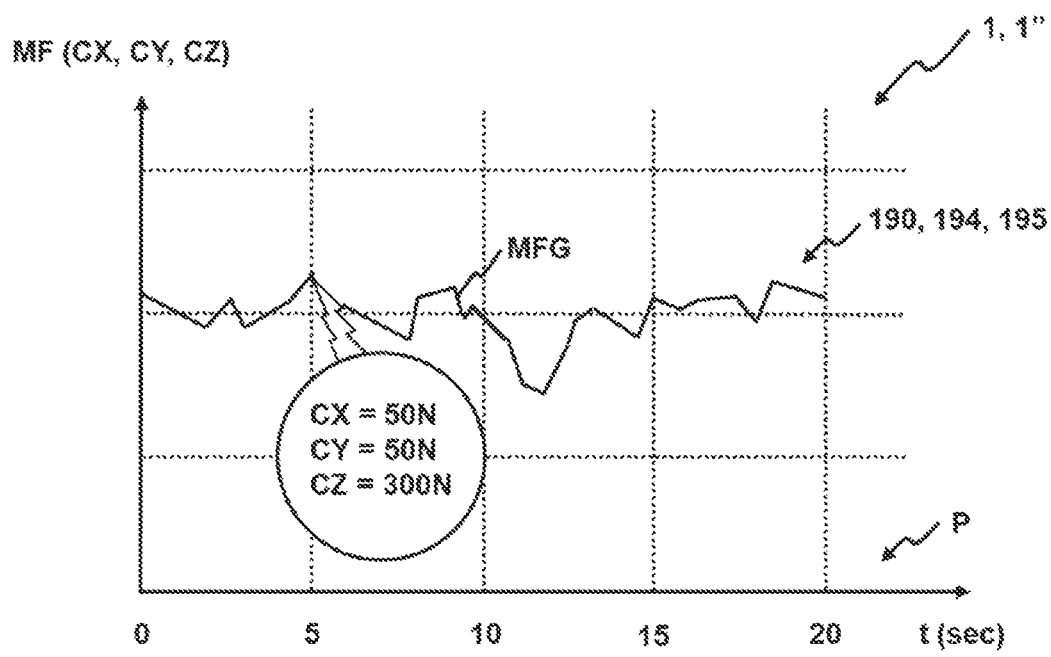
FIG. 16 schematically represents a machining force MF of the drilling device 1" of FIG. 2.

According to FIG. 16, the machining force MF of the drilling device 1" of FIG. 2 is plotted over the cutting tool time t, resulting in a machining force graph MFG. At a cutting tool time t=5 sec, the machining force MF comprises a horizontal component CX=50N, a transverse component CY=50N, and a vertical component CZ=300N. Later on, for a cutting tool time t=12 sec, the magnitude of the machining force MF passes through a minimum.

Figure 17:
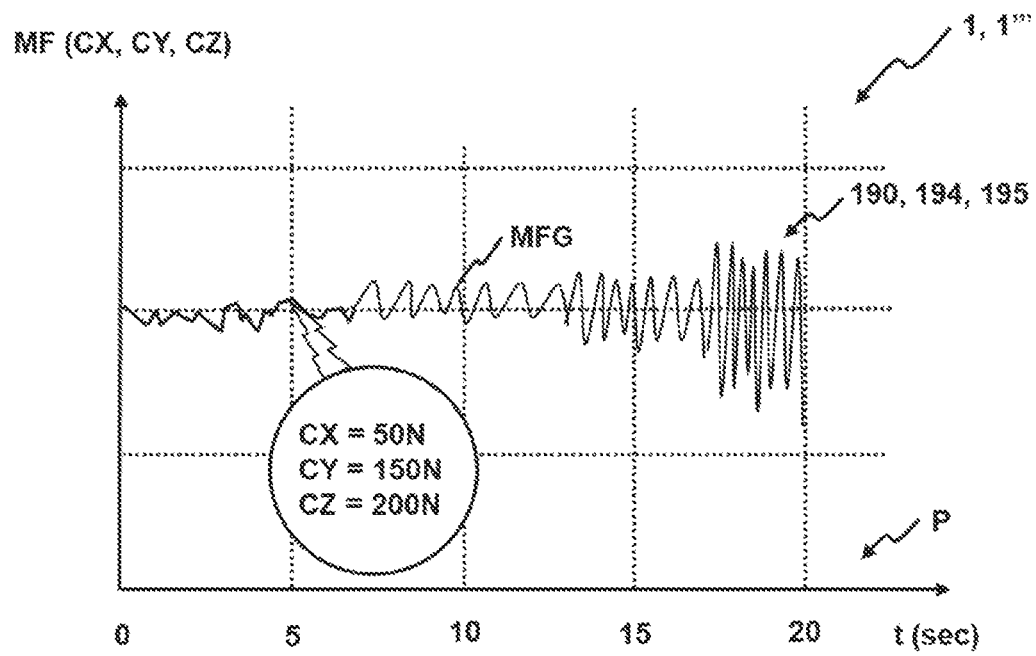
FIG. 17 schematically represents a machining force MF of the milling device 1'" of FIG. 3.

According to FIG. 17, the machining force MF of the milling device 1" of FIG. 3 is plotted over the cutting tool time t, resulting in a machining force graph MFG. At a cutting tool time t=5 sec, the machining force MF comprises a horizontal component CX=50N, a transverse component CY=150N, and a vertical component CZ=200N. Later on, the magnitude of the machining force MF is oscillating. The magnitudes of the oscillations of the machining force MF are increasing with the cutting tool time t.

Figure 18:
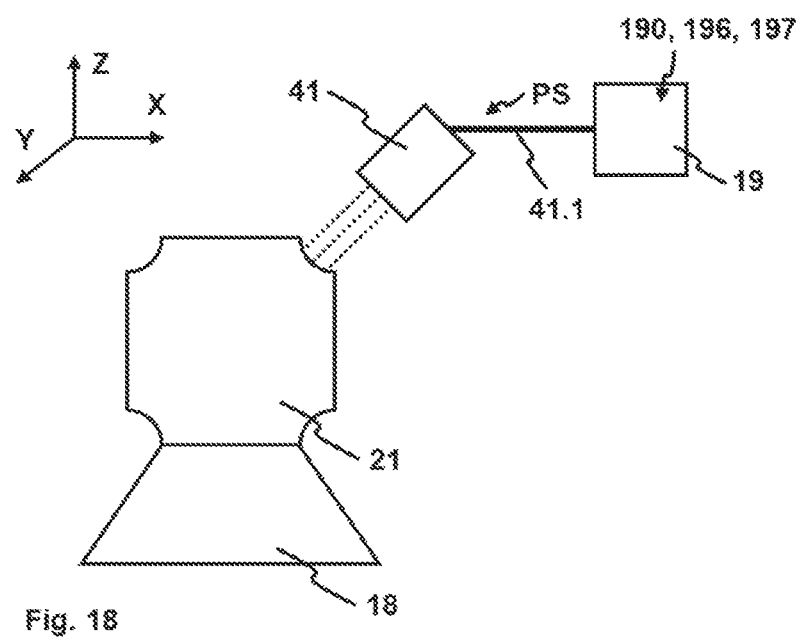
FIG. 18 schematically shows a view of a part of a profilometer 41 during a product quality measurement of a product 21 obtained by subtractive manufacturing with the device 1 of one of the FIGS. 1-3.

FIG. 18 schematically depicts a measurement of at least one product quality PQ of the product 21. The product quality PQ is a physical requirement of the product 21, such as a dimensional accuracy, a surface roughness, etc. The measurement of the product quality PQ desirably is performed by a profilometer 41 such as a diamond stylus, an interferometer, etc.

For a measured product quality PQ of the product 21, the profilometer 41 creates at least one profilometer signal PS.

The profilometer signal PS is at least one of a dimensional accuracy deviation, a surface roughness deviation, etc. Each profilometer signal PS is linked with exactly one product position PP such as a product distance ε, etc. In actual practice, the measured product quality PQ of the product 21 results in several thousand profilometer signals PS, and each profilometer signal PS is linked with a product position PP.

The profilometer 41 transmits the profilometer signal PS to the control unit 19 by means of at least one profilometer line 41.1, such as a signal cable. The control unit 19 makes the profilometer signal PS available as digital product quality data 196. Preferably, product quality data 196 are stored in the memory device 19.3 of the control unit 19.

The control program product 190 is configured to read the product quality data 196 and the product position data 197. The control program product 190 is configured to gather and organize the product quality data 196 into a graph as a function of product distance. The resulting product quality graphs PQG are represented in the FIGS. 19-21.

Figure 19:
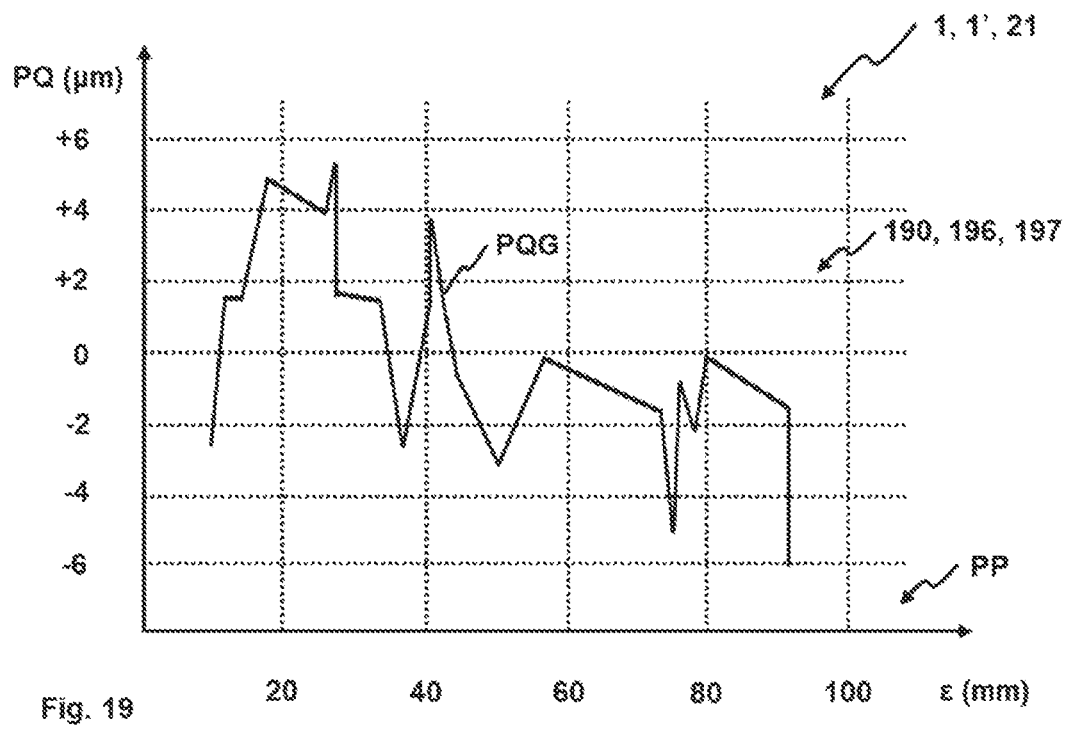
FIG. 19 schematically represents a product quality PQ of a product 21 measured with the profilometer 41 of FIG. 18, the product 21 has been obtained by subtractive manufacturing with the turning device 1' of FIG. 1.

According to FIG. 19, the product quality PQ of the product 21 obtained with the device 1 in the embodiment of a turning device 1' is plotted as a function of a product distance ε, resulting in a product quality graph PQG. The product quality PQ is a dimensional accuracy deviation indicated in micrometers (μm) and a corresponding product distance c is indicated in millimeters (mm). The product distance ε has a length of approximately 100 mm. Along the length of the product distance ε, the dimensional accuracy deviation decreases from +6 μm to −6 μm.

Figure 20:
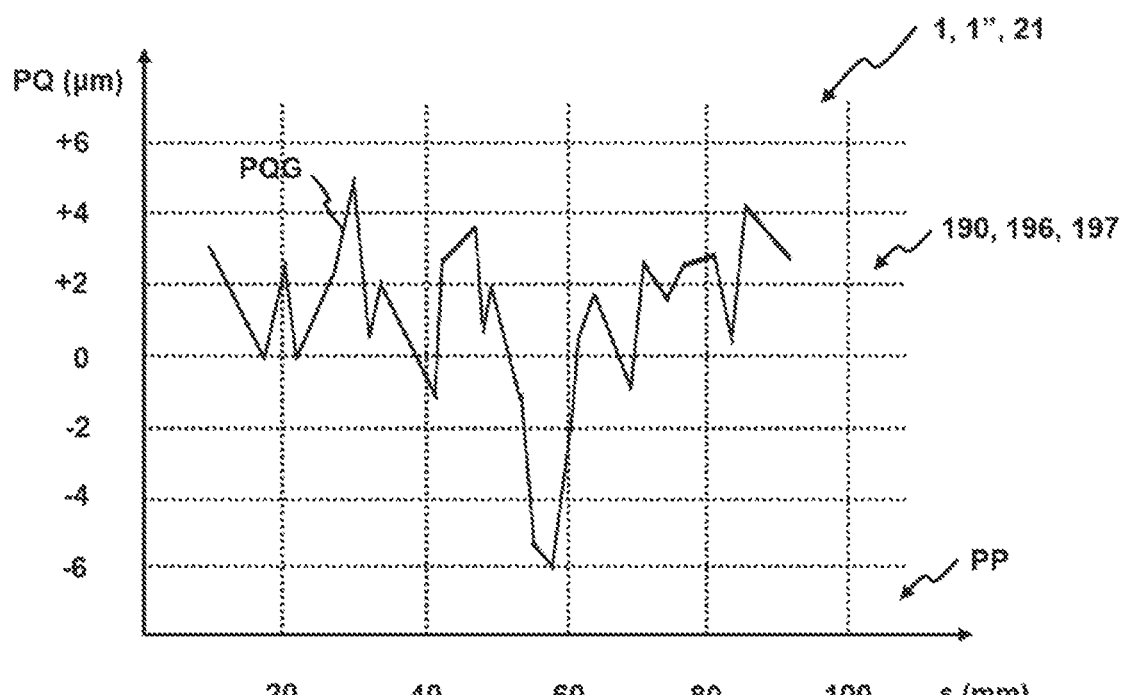
FIG. 20 schematically represents a product quality PQ of a product 21 measured with the profilometer 41 of FIG. 18, the product 21 has been obtained by subtractive manufacturing with the drilling device 1" of FIG. 2.

According to FIG. 20, the product quality PQ of the product 21 obtained by the device 1 in the embodiment of a drilling device 1" is plotted as a function of a product distance ε, resulting in a product quality graph PQG. The product quality PQ is a surface roughness deviation indicated in μm and a corresponding product distance c is indicated in mm. The product distance c has a length of approximately 100 mm. Along the length of the product distance ε, the surface roughness is mostly in the range of +4 μm to −2 μm. But for a product distance ε=55 mm, the surface roughness is −6 μm.

Figure 21:
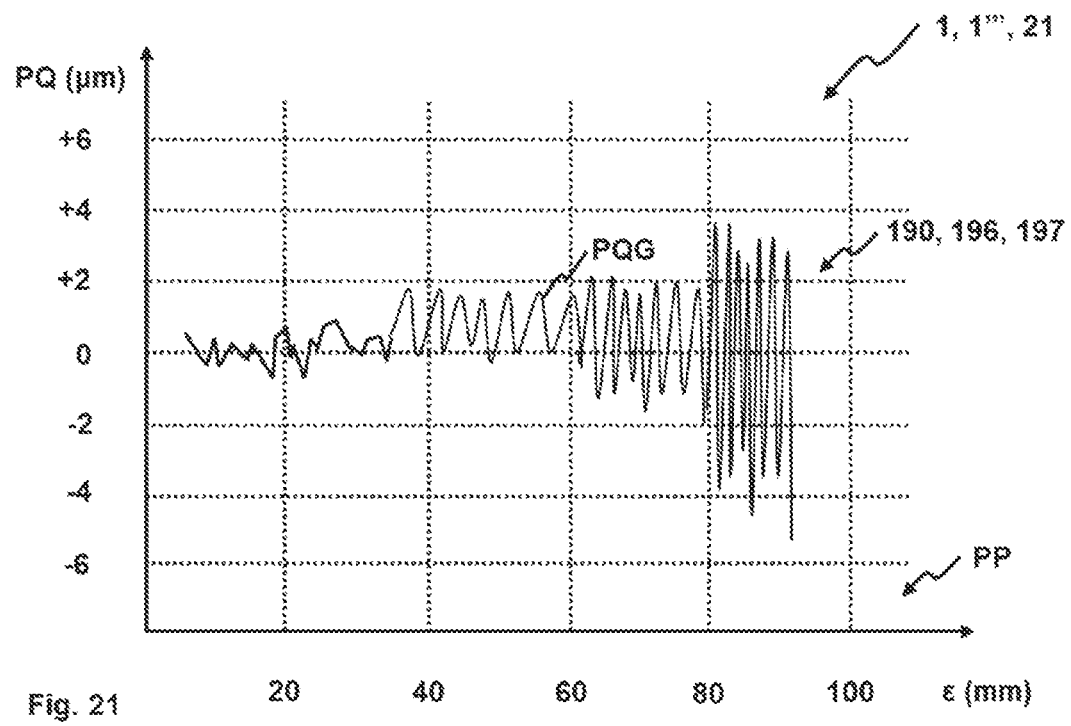
FIG. 21 schematically represents a product quality PQ of a product 21 measured with the profilometer 41 of FIG. 18, the product 21 has been obtained by subtractive manufacturing with the milling device 1'" of FIG. 3.

According to FIG. 21, the product quality PQ of the product 21 obtained by the device 1 in the embodiment of a milling device 1''' is plotted as a function of a product distance ε, resulting in a product quality graph PQG. And the product quality PQ is a surface roughness deviation indicated in μm and a corresponding product distance c is indicated in mm. The product distance c has a length of approximately 100 mm. The surface roughness deviation is oscillating. Along the length of the product distance ε, an amplitude of the oscillations of the surface roughness increases from +/−0 μm to +/−4 μm.

Subtractive manufacturing of the product 21 with the product quality PQ of the FIGS. 19-21 has been done with the device 1 of one of the FIGS. 1-3. During subtractive manufacturing of the product 21, the machining force MF of the FIGS. 15-17 has been exerted on the workpiece 20. The product quality PQ may be correlated with the machining force MF. In the following, the control program product 190 is configured to correlate the product quality graphs PQG of the product 21 of the FIGS. 19-21 with the machining force graphs MFG of the FIGS. 15-17 to determine a product quality/machining force correlation PQMF.

Figure 22:
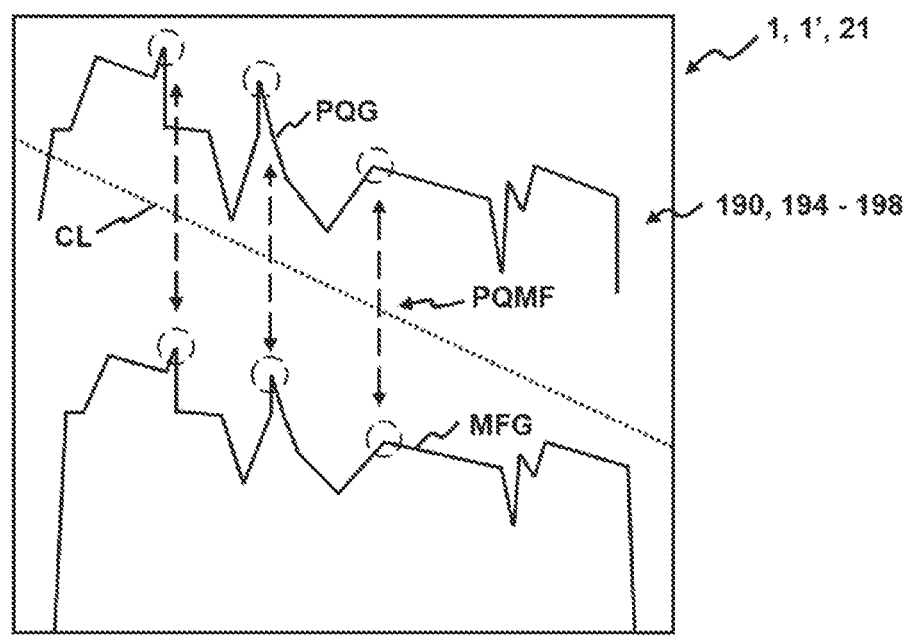
FIG. 22 schematically represents for the turning device 1' of FIG. 1 a correlation of the machining force MF of FIG. 15 with the product quality PQ of the product 21 of FIG. 19.

According to FIG. 22, the product quality graph PQG of the product 21 of FIG. 19 is correlated with the machining force graph MFG of the turning device 1' of FIG. 15. The control program product 190 plots both graphs in a space. The control program product 190 is configured to identify characteristic patterns in both graphs such as peaks, valleys, etc. Characteristic patterns are identified schematically by dashed circles. Preferably, the control program product 190 is configured to plot the product quality graphs PQG above the machining force graphs MFG such that identified characteristic patterns lie in the space one above the other. The control program products 190 is configured to correlate identified characteristic patterns in the product quality graph PQG and in the machining force graph MFG. The resulting product quality/machining force correlation PQMF of identified characteristic patterns is shown schematically by double-sided dashed arrows. Preferably, the identified characteristic patterns in both graphs are along the ordinate in an identical distance with respect to a correlation line CL that is schematically represented by a dotted line in FIGS. 22, 23 and 24.

Figure 23:
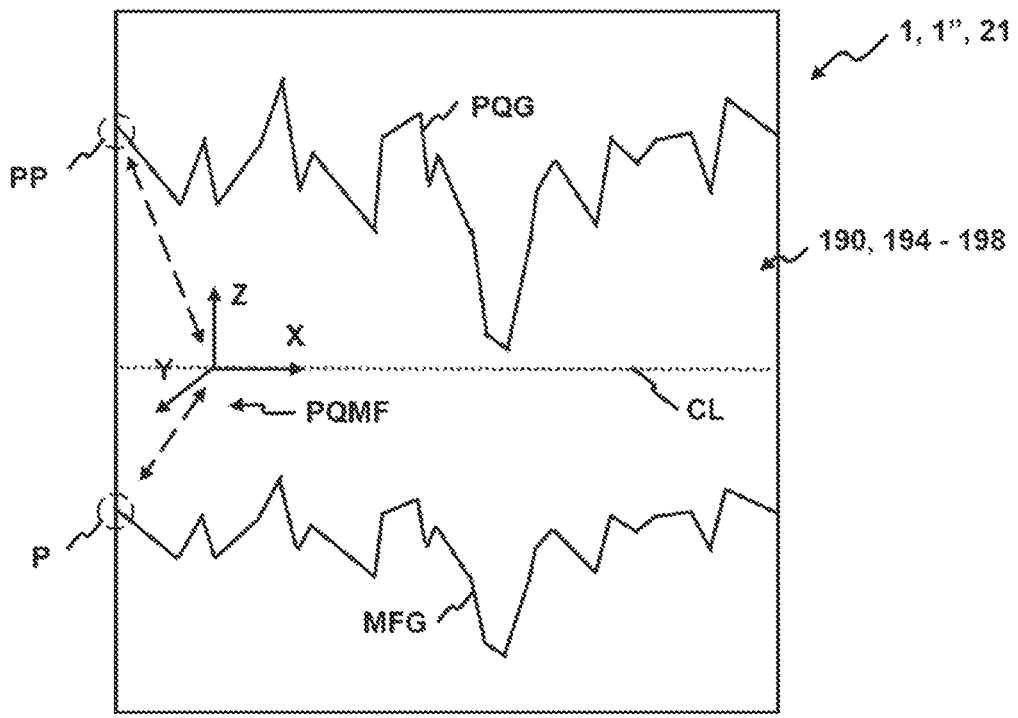
FIG. 23 schematically represents for the drilling device 1" of FIG. 2 a correlation of the machining force MF of FIG. 16 with the product quality PQ of FIG. 20.

According to FIG. 23, the product quality graph PQG of the product 21 of FIG. 20 is correlated with the machining force graph MFG of the drilling device 1" of FIG. 16. The control program product 190 is configured to identify a product position PP in the product quality graph PQG. And the control program product 190 is configured to identify a position P in the machining force graph MFG. The control program product 190 is configured to correlate the identified product position PP in the product quality graph PQG and the identified position P in the machining force graph MFG. Preferably, the product position PP in the product quality graph PQG and the position P in the machining force graph MFG are correlated, because they have an identical reference position in the three-dimensional coordinate system XYZ. The identified product position PP in the identified correlated product quality graph PQG and the position P in the machining force graph MFG are shown schematically by dashed circles. The resulting product quality/machining force correlation PQMF of the identified product position PP in the product quality graph PQG with the identified position P in the machining force graph MFG, is shown schematically by double-sided dashed arrows. Preferably, the identified product position PP in the product quality graph PQG and the identified position P in the machining force graph MFG are along the ordinate in an identical distance with respect to a correlation line CL.

Figure 24:
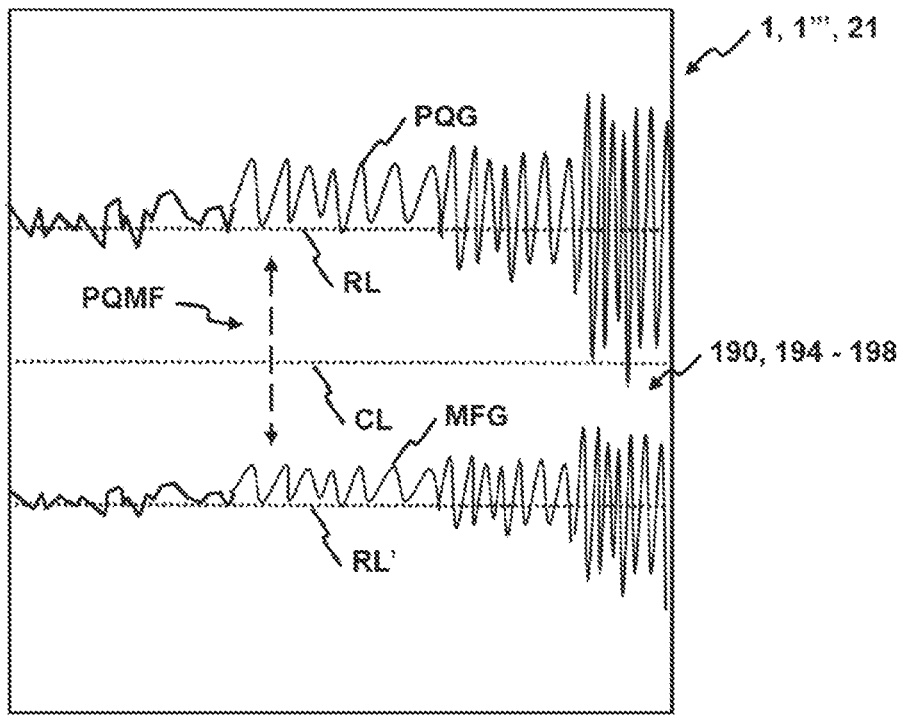
FIG. 24 schematically represents for the milling device 1'" of FIG. 3 a correlation of the machining force MF of FIG. 17 with the product quality PQ of FIG. 21.

According to FIG. 24, the product quality graph PQG of the product 21 of FIG. 21 is correlated with the machining force graph MFG of the milling device 1''' of FIG. 17. The control program product 190 is configured to plot the two graphs in a space and to determine for the product quality graph PQG a regression line RL and to determine for the machining force graph MFG a regression line RL'. The control program product 190 is configured to correlate the regression lines RL for the product quality graph PQG with the regression lines RL' for the machining force graph MFG. The resulting product quality/machining force correlation PQMF is shown schematically by double-sided dashed arrows. Preferably, the two regression lines RL, RL' for both graphs are along the ordinate in an identical distance with respect to a correlation line CL.

The product quality/machining force correlation PQMF is made available as digital product quality/machining force data 198. Preferably, product quality/machining force data 198 are stored in the memory device 19.3 of the control unit 19.

Fourth Step IV

At least one physically required product quality boundary PQB, PQB' of the product 21, such as a predefined dimensional accuracy, a predefined surface roughness, etc. is provided. Preferably, the product quality boundary PQB, PQB' is part of the design data 121 that are stored in the memory device 12.3 of the drive control unit 12. The drive control unit 12 transmits the product quality boundary PQB, PQB' to the control unit 19 by means of the control unit line 19.1.

The control program product 190 is configured to read the product quality boundary PQB, PQB' and to append the product quality boundary PQB, PQB' to the product quality graph PQG of the FIGS. 22-24 where the product quality boundary PQB, PQB' is represented by a dashed line.

Figure 25:
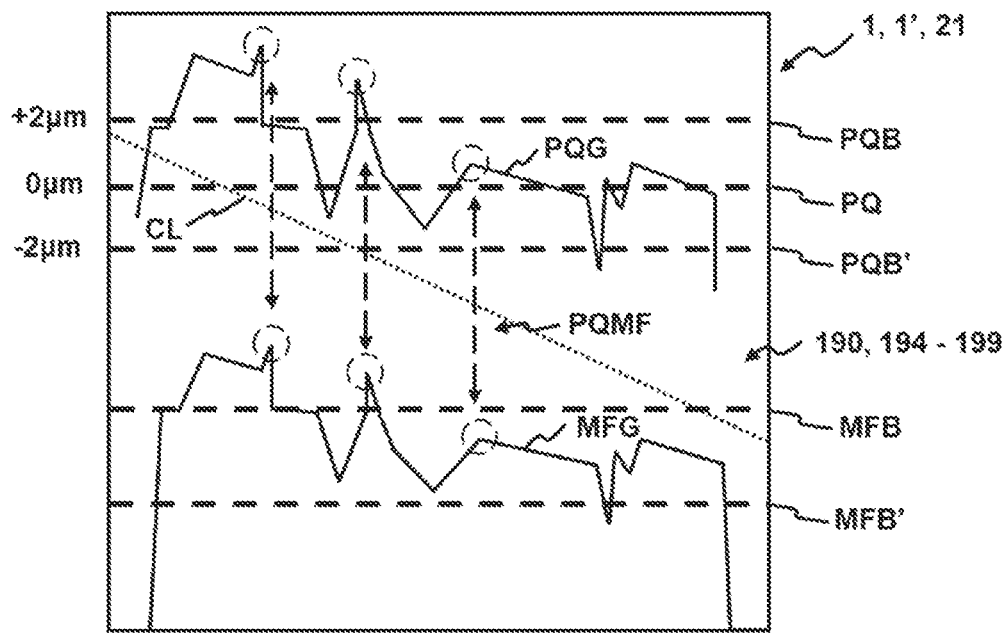
FIG. 25 schematically represents for the turning device 1' of FIG. 1 the determination of a machining force boundary MFB, MFB' for the machining force MF of FIG. 15.

According to FIG. 25, the product quality PQ is normalized to 0 μm dimensional accuracy, which represents the best possible product quality PQ. With respect to this best possible product quality PQ, the product quality graph PQG has an upper product quality boundary PQB of +2 μm dimensional accuracy and a lower product quality boundary PQB' of −2 μm dimensional accuracy.

Figure 26:
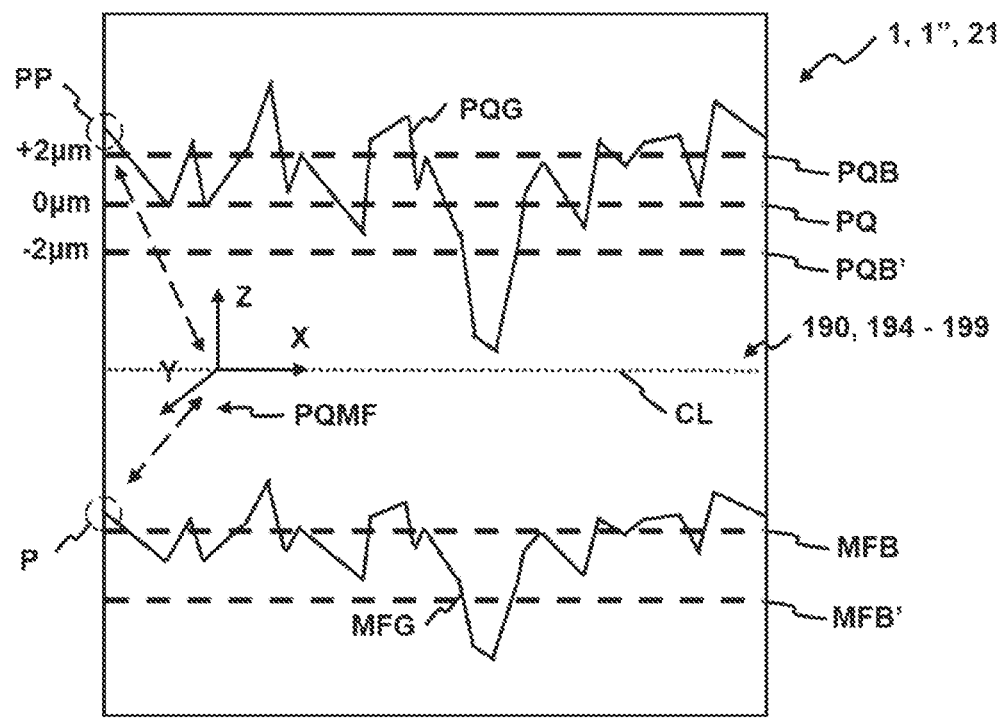
FIG. 26 schematically represents for the drilling device 1" of FIG. 2 the determination of a machining force boundary MFB, MFB' for the machining force MF of FIG. 16.

According to FIG. 26, the product quality PQ is normalized to 0 μm dimensional accuracy, which represents the best possible product quality PQ. With respect to this best possible product quality PQ, the product quality graph PQG has an upper product quality boundary PQB of +2 μm dimensional accuracy and a lower product quality boundary PQB' of −2 μm dimensional accuracy.

Figure 27:
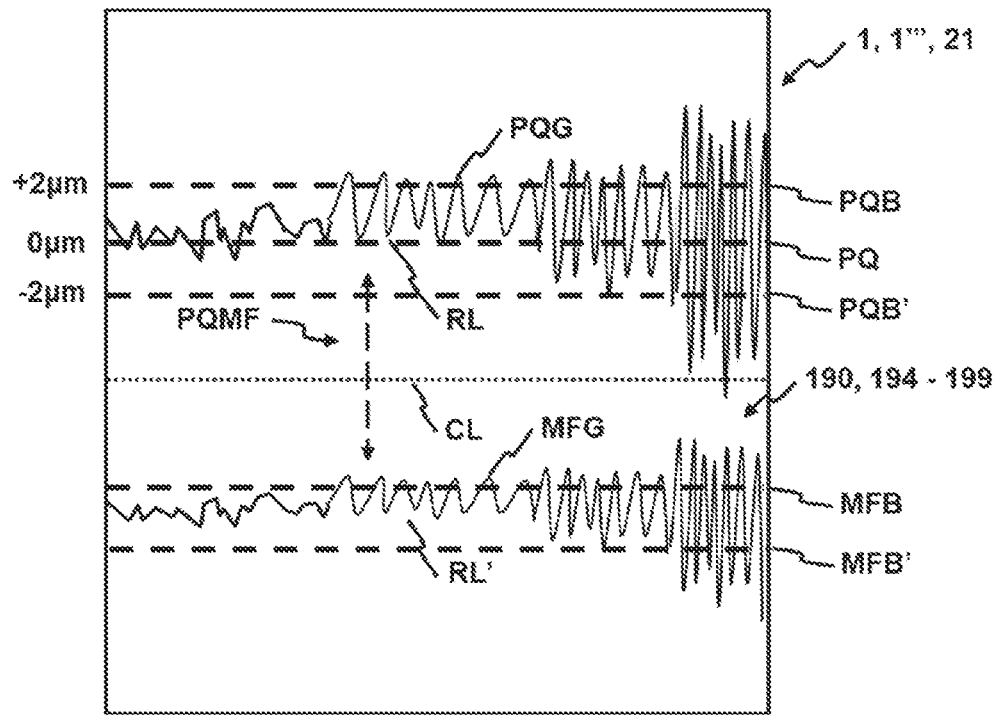
FIG. 27 schematically represents for the milling device 1'" of FIG. 3 the determination of a machining force boundary MFB, MFB' for the machining force MF of FIG. 17.

According to FIG. 27, the product quality PQ is normalized to 0 μm surface roughness, which represents the best possible product quality PQ. With respect to this best possible product quality PQ, the product quality graph PQG has an upper product quality boundary PQB of +2 μm surface roughness and a lower product quality boundary PQB' of −2 μm surface roughness.

The control program product 190 is configured to use the product quality/machining force correlation PQMF and to determine at least one machining force boundary MFB, MFB' of the machining force MF.

According to FIG. 25, due to the known distance of identified characteristic patterns in both graphs with respect to a correlation line CL according to FIG. 22, the control program product 190 is configured to determine a machining force boundary MFB, MFB' that is similar in shape and size to the product quality boundary PQB, PQB'.

According to FIG. 26, due to the known distance of an identified product position PP in the product quality graph PQG and an identified position P in the machining force graph MFG with respect to a correlation line CL according to FIG. 23, the control program product 190 is configured to determine a machining force boundary MFB, MFB' that is similar in shape and size to the product quality boundary PQB, PQB'.

According to FIG. 27, due to the known distance of regression lines RL, RL' for both graphs with respect to a correlation line CL according to FIG. 24, the control program product 190 is configured to determine a machining force boundary MFB, MFB' that is similar in shape and size to the product quality boundary PQB, PQB'.

The control program product 19 is configured to append the determined machining force boundary MFB, MFB' to the machining force graph MFG of the FIGS. 25-27. The machining force boundary MFB, MFB' is represented by a dashed line.

The machining force boundary MFB, MFB' is made available as digital machining force reference data 199. Preferably, the machining force reference data 199 are stored in the memory device 19.3 of the control unit 19.

Figure 28:
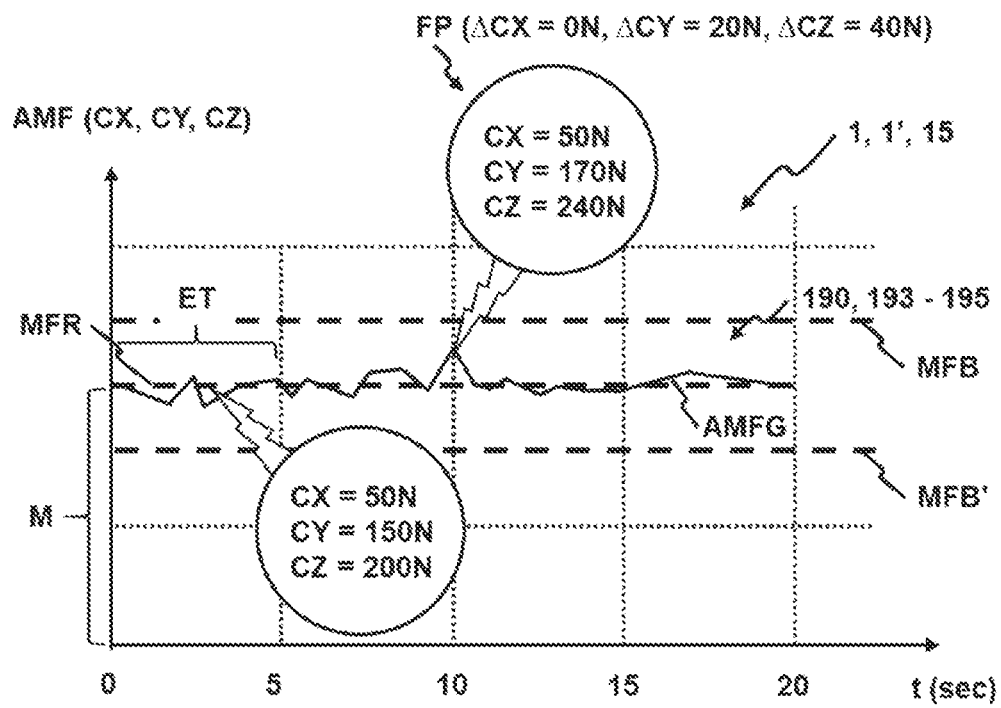
FIG. 28 schematically represents an actually exerted machining force AMF of the turning device 1' of FIG. 1 with a machining force reference MFR and a machining force boundary MFB, MFB'.
Figure 29:
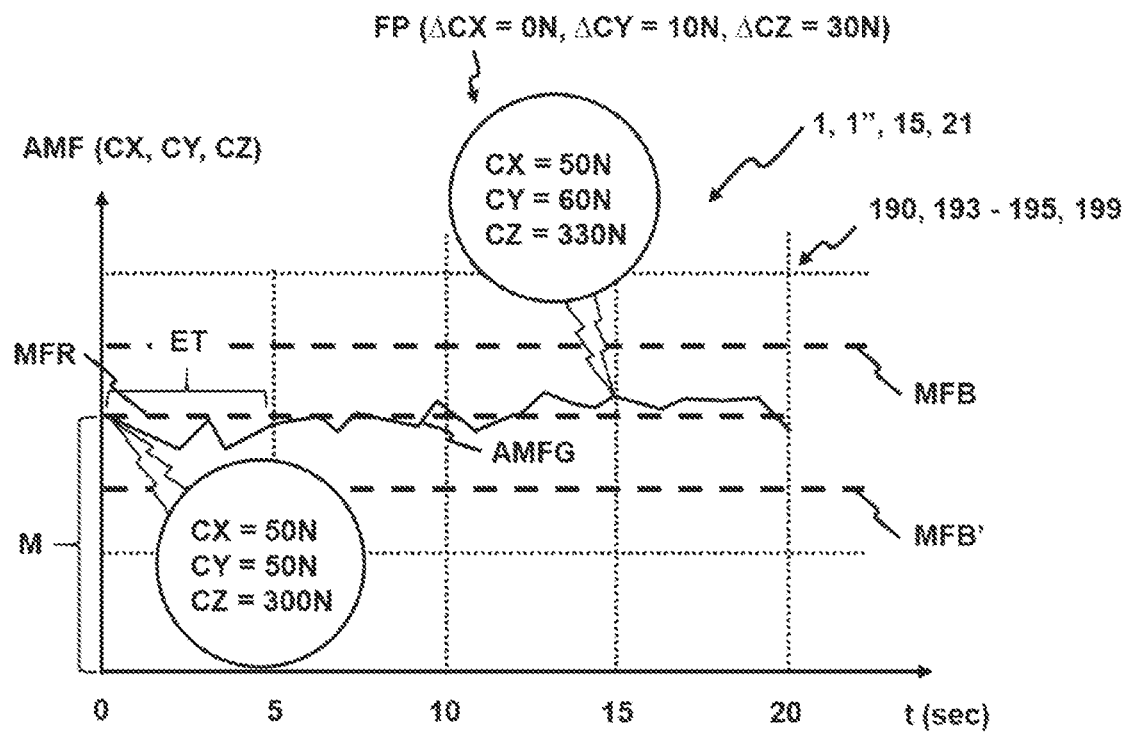
FIG. 29 schematically represents an actually exerted machining force AMF of the drilling device 1" of FIG. 2 with a machining force reference MFR and a machining force boundary MFB, MFB'.
Figure 30:
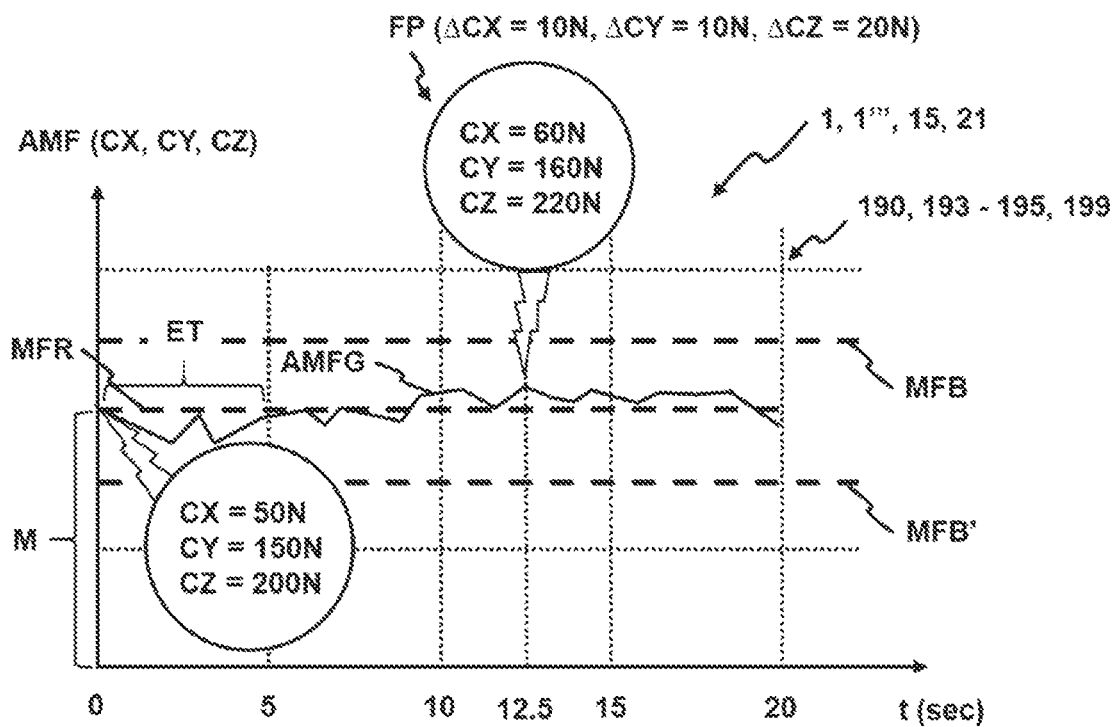
FIG. 30 schematically represents an actually exerted machining force AMF of the milling device 1'" of FIG. 3 with a machining force reference MFR and a machining force boundary MFB, MFB'.

From this level, the fourth step IV is similar to the second step II and reference is made to the description of the FIGS. 11-14 of the second step II. The following FIGS. 28-30 are similar to the FIGS. 11-13, except that the control program product 19 is configured to has append a machining force boundary MFB, MFB' to the actually exerted machining force graph AMFG. The machining force boundary MFB, MFB' is represented by a dashed line.

The control program product 19 is configured to evaluate whether the actually exerted machining force AMF exceeds the machining force boundary MFB, MFB'. The product quality PQ of the product 21 is deemed to have been automatically ascertained once the actually exerted machining force AMF does not exceed the machining force boundary MFB, MFB'.

If the actually exerted machining force AMF exceeds the machining force boundary MFB, MFB', then the control program product 190 is configured to determine at least one force portion FP of the actually exerted machining force AMF that is subject to correction. And here again, from this level, the fourth step IV is similar to the second step II, and accordingly reference is made to the description of the FIGS. 11-14, where the control program product 190 is configured to determine at least one force portion FP of the actually exerted machining force AMF and where the control program product 190 is configured to read the deflection/test force data 193 and to use the deflection/test force relation DFX, DFY, DFZ to determine for the determined force portion FP at least one correction deflection CDX, CDY, CDZ of the device 1. Then the control program product 190 is configured to use the determined correction deflection CDX, CDY, CDZ to create at least one corrected drive control signal CDS, CDS'.

Each of the control unit 19 and the drive control unit 12 may be its own physically separated unit with its own housing, which also may be physically separated. In such an embodiment, the physically separated units may be situated anywhere in the world. In this case, the control unit line 19.1 desirably is wire-based or wireless such as a telephone network, the Internet, etc.

The control unit 19 and the drive control unit 12 may be a physically integrated unit with a common housing. In such an embodiment, the physically integrated unit control unit 19 and drive control unit 12 may have a common processor device and a common memory device.

Figure 31:
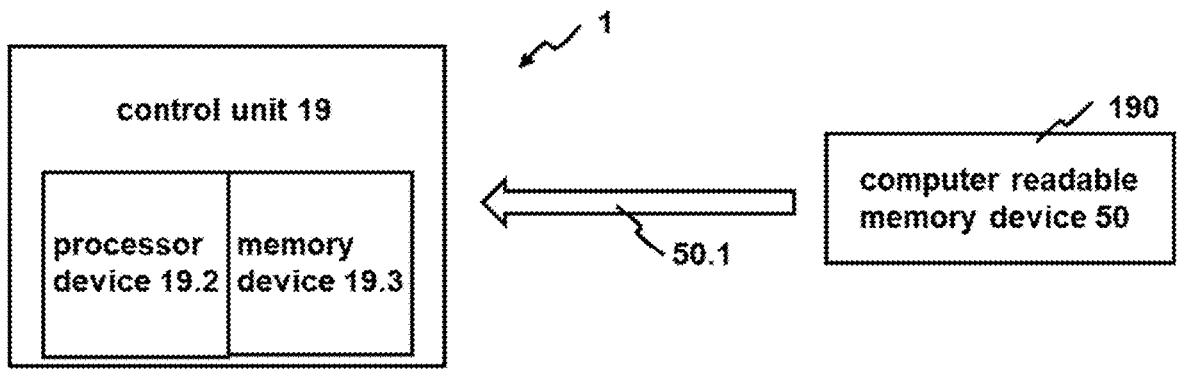
FIG. 31 schematically shows a loading of a control program product 190 from a computer readable memory device 50 into the device 1 of one of the FIGS. 1-3.

The control program product 190 may be carried on a computer readable memory device 50 such as shown in FIG. 31. The computer readable memory device 50 may be placed anywhere in the world. The control program product 190 may be loaded from the computer readable memory device 50 into the memory device 19.3 of the control unit 19 by means of a transmission line 50.1. The transmission line 50.1 may be wire-based or wireless such as a telephone network, the Internet, etc.

Present invention may be embodied in many different forms and should not be construed as limited to the embodiments of the figures.

LIST OF REFERENCE NUMERALS

1, 1', 1", 1''' device
10 base
11, 11', 11" drive unit
11.1, 11.1', 11.1" encoder
12 drive control unit
120 drive control program product
121 digital design data
122 manufacturing step data
12.1, 12.1' drive control unit line
12.2 processor device of the drive control unit 12.3 memory device of the drive control unit
13 cutting tool post
13' cutting tool chuck
14 cutting tool holder
15, 15', 15", 15''' cutting tool
16 sensor device
16.1 sensor device line
17 sensor evaluation unit
17.1 sensor evaluation unit line
18 workpiece holder
19 control unit
19.1 control unit line
19.2 processor device of the control unit
19.3 memory device of the control unit
190 control program product
191 test force data
192 deflection data
193 deflection/test force data
194 position data
195 machining force data
196 product quality data
197 product position data
198 product quality/machining force correlation data
199 machining reference force data
20 workpiece
21 product
31 force actuator
31.1 force actuator line
32 deflection sensor
32.1 deflection sensor line
41 profilometer
41.1 profilometer line
50 computer readable memory device
50.1 transmission line
AMF actually exerted machining force
AMFG actually exerted machining force graph
AS actuator signal
CDS, CDS' corrected drive control signal
CDX, CDY, CDZ correction deflection
CL correlation line
CMF corrected machining force
CX, CY, CZ component
ΔX, ΔY, ΔZ deflection distance
ΔCX, ΔCY, ΔCZ component portion
D depth of cut
D15 deflection
DS, DS' drive control signal
DFX, DFY, DFZ deflection/test force relationship
ε product distance
ES, ES' encoder signal
ESS evaluated sensor signal
ET evaluation time
F filter
FM feed movement
FMF future exerted machining force
FP force portion
FS deflection signal
G gain
I, II, III, IV step
M magnitude
MF machining force
MFB, MFB' machine force boundary
MFG machining force graph
MFR machining force reference
P position
PP product position
PQ product quality
PQB, PQB' product quality boundary
PQG product quality graph
PQMF product quality/machining force relationship
PS profilometer signal
QS quality signal
R rotation movement
RL, RL' regression line
SS sensor signal
t cutting tool time
TF test force
XY plane
XYZ three-dimensional coordinate system
X, Y, Z axis

What is claimed is:

1. A method to achieve a desired quality of a product, which product has been obtained by operation of a tool of a subtractive manufacturing device that removes material from a workpiece by cutting or drilling the workpiece, the method comprising the steps of:
   determining at least one relationship between a test force generated by an external force actuator acting on the tool and a deflection of the tool of the subtractive manufacturing device;
   after completion of the prior step, using a force sensor configured to measure forces applied in at least three orthogonally related directions to measure a first actually exerted machining force applied to the workpiece by the tool of the subtractive manufacturing device;
   automatically determining a machining force reference for said actually exerted machining force that was measured, wherein the machining force reference is determined as a magnitude of an actually exerted machining force that is exerted on the workpiece and remains stable during a predetermined evaluation time;
   automatically evaluating whether said actually exerted machining force deviates from said machining force reference;
   if an actually exerted machining force equals said machining force reference, then the desired quality of the product is deemed to have been achieved and operation of the tool to remove material from the workpiece by cutting or drilling the workpiece is terminated;
   if an actually exerted machining force deviates from said machining force reference, then using said at least one relationship between a test force generated by the external force actuator acting on the tool to automatically determine at least one correction deflection of said tool of the subtractive manufacturing device for changing said first actually exerted machining force to a second actually exerted machining force; and
   automatically creating at least one corrected drive control signal to fully or partially reduce said at least one correction deflection.

2. The method according to claim 1, wherein said step of determining at least one relationship between a test force generated by an external force actuator acting on the cutting tool and a deflection of the cutting tool of the subtractive manufacturing device comprises:
   using the external force actuator for exerting a test force on said subtractive manufacturing device to deflect said subtractive manufacturing device;
   creating at least one actuator signal for said exerted test force;
   measuring a deflection of said subtractive manufacturing device;
   creating at least one deflection signal for said measured deflection; and determining said relationship between the test force generated by the external force actuator acting on the cutting tool and a deflection of the cutting tool from said actuator signal and said deflection signal.

3. The method according to claim 2, wherein said step of determining at least one relationship between a test force generated by an external force actuator acting on the cutting tool and a deflection of the tool of the subtractive manufacturing device further comprises:
measuring said deflection as a horizontal deflection distance along a horizontal axis, measuring said deflection as a transverse deflection distance along a transverse axis, and measuring said deflection as a vertical deflection distance along a vertical axis.

4. The method according to claim 1, wherein said step of using a force sensor to measure a first actually exerted machining force applied to the workpiece by the tool of the subtractive manufacturing device comprises:
creating at least one drive control signal and transmitting the at least one drive control signal to control the subtractive manufacturing device to cause the tool to exert an actual machining force on the workpiece to remove material from the workpiece;
measuring a horizontal component that acts along a horizontal axis of said actually exerted machining force, measuring a transverse component that acts along a transverse axis of said actually exerted machining force, and measuring a vertical component that acts along a vertical axis of said actually exerted machining force; and
using a magnitude of said actually exerted machining force that remains stable during a predetermined evaluation time as a machining force reference.

5. The method according to claim 1, wherein said step of using a force sensor to measure a first actually exerted machining force applied to the workpiece by the tool of the subtractive manufacturing device comprises:
if an actually exerted machining force deviates from said machining force reference, then determining at least one force portion of said actually exerted machining force;
using said relationship between a test force generated by an external force actuator acting on the cutting tool and a deflection of the tool to determine for said force portion at least one correction deflection of said tool of said subtractive manufacturing device; and
wherein said corrected drive control signal is at least one of a corrected position of the selected cutting tool, a corrected position of the workpiece, a corrected rotation movement, a corrected feed movement, a corrected depth of cut, a corrected gain, a corrected amplitude, and a corrected filter.

6. The method according to claim 1, further comprising in a third step that includes:
creating at least one drive control signal and transmitting the at least one drive control signal to the subtractive manufacturing device to cause the tool to exert a machining force on the workpiece to remove material from the workpiece;
measuring said exerted machining force;
creating at least one sensor signal for said measured machining force;
measuring at least one product quality of the product, wherein product quality is either a surface roughness of the workpiece or a dimensional accuracy of the workpiece;
creating at least one profilometer signal for said measured product quality; and
determining at least one correlation between the product quality of the product and the machining force that is measured to have been exerted on the workpiece.

7. The method according to claim 6, wherein said third step further comprises:
making available said sensor signal as machining force data;
plotting said machining force data as a function of a product distance to generate a machining force graph;
making available said product quality as product quality data;
plotting said product quality data as a function of the product distance to generate a product quality graph; and
determining said at least one correlation by means of one of the following:
correlating characteristic patterns identified in said machining force graph with characteristic patterns identified in said product quality graph; or
correlating a position identified in said machining force graph with a product position identified in said product quality graph; or
correlating a regression line for said product quality graph with a regression line for said machining force graph.

8. The method according to claim 6, further comprising in a fourth step that includes:
providing at least one product quality boundary for said product quality;
using said at least one correlation to determine at least one machining force boundary of said actually exerted machining force;
evaluating whether said actually exerted machining force exceeds said machining force boundary; and
if said actually exerted machining force does not exceed said machining force boundary, then a desired product quality of said product is automatically ascertained.

9. The method according to claim 8, wherein said fourth step further comprises:
automatically evaluating, whether for said corrected drive control signal, at least one of an actually exerted machining force or a future exerted machining force exceeds said machining force boundary.

10. An apparatus that performs a method to fine control machining a workpiece by removing material via application of a cutting or drilling tool of a subtractive manufacturing device, the apparatus comprising:
an external force actuator configured and disposed to apply a predetermined force to the tool;
a deflection sensor that is configured to measure a deflection of the tool;
a sensor device connected to the subtractive manufacturing device and configured for measuring an actually exerted machining force applied by the tool of the subtractive manufacturing device to the workpiece, wherein said sensor device is configured to measure a horizontal component of said actually exerted machining force that acts along a horizontal axis, wherein said sensor device is configured to measure a transverse component of said actually exerted machining force that acts along a transverse axis that is normal to the horizontal axis, and wherein said sensor device is configured to measure a vertical component of said actually exerted machining force that acts along a vertical axis that is normal to both the horizontal axis and to the transverse axis;

a control unit connected to the drive control unit and including at least one relationship between the predetermined force acting on the tool and the deflection of the tool of the subtractive manufacturing device; and wherein said sensor device is configured to create at least one sensor signal for said measured actually exerted machining force.

11. An apparatus according to claim 10, further comprising:

a drive control unit connected to said sensor device and to the subtractive manufacturing device and configured to create at least one drive control signal transmitted to the subtractive manufacturing device to cause the tool of the subtractive manufacturing device to actually exert said machining force to the workpiece via the tool;

wherein, the control unit is configured to monitor said actually exerted machining force for a magnitude that remains within a predetermined range during a predetermined evaluation time, the control unit being configured to store a magnitude of a machining force reference equal to the magnitude of the actually exerted machining force that remains within the predetermined range during the predetermined evaluation time;

wherein said control unit is configured to evaluate whether said actually exerted machining force deviates from said machining force reference;

wherein said control unit is configured to store deflection data of said relationship between the predetermined force acting on the tool and the deflection of the tool;

wherein said control unit is configured so that if said actually exerted machining force deviates from said machining force reference, then said control unit is configured to use said deflection data to determine for said actually exerted machining force at least one correction deflection of the tool of the subtractive manufacturing device;

wherein said control unit is configured to use said correction deflection to create at least one corrected drive control signal and to transmit said at least one corrected control signal to said drive control unit; and wherein said drive control unit is configured to use said corrected drive control signal to fully or partially reduce said correction deflection.

12. An apparatus according to claim 11, wherein the drive control unit includes a processor device and a memory device connected to the processor device.

13. An apparatus according to claim 11, wherein the control unit includes a processor device and a memory device connected to the processor device and configured to store said corrected drive control signal and said relationship between a test force acting on the tool and a deflection of the tool.

14. An apparatus according to claim 11, further comprising a profilometer connected to the control unit and configured to measure at least one product quality of the product, wherein product quality is either a surface roughness of the workpiece or a dimensional accuracy of the workpiece.

15. An apparatus according to claim 10, wherein the tool is at least one cutting tool;

wherein the subtractive manufacturing device includes a cutting tool holder that holds the at least one cutting tool; and wherein said deflection sensor is configured to measure said deflection as a horizontal deflection distance along a horizontal axis, wherein said deflection sensor is configured to measure said deflection as a transverse deflection distance along a transverse axis, and wherein said deflection sensor is configured to measure said deflection as a vertical deflection distance along a vertical axis.

* * * * *